US010542217B2

(12) United States Patent
Yamada et al.

(10) Patent No.: US 10,542,217 B2
(45) Date of Patent: Jan. 21, 2020

(54) SHOOTING DEVICE AND SHOOTING METHOD TO SUPPRESS BLUR IN AN IMAGE

(71) Applicant: SONY SEMICONDUCTOR SOLUTIONS CORPORATION, Kanagawa (JP)

(72) Inventors: Hideshi Yamada, Kanagawa (JP); Daisuke Iso, Tokyo (JP); Teppei Kurita, Tokyo (JP); Shun Li, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 15/773,695

(22) PCT Filed: Nov. 11, 2016

(86) PCT No.: PCT/JP2016/083474
§ 371 (c)(1),
(2) Date: May 4, 2018

(87) PCT Pub. No.: WO2017/090458
PCT Pub. Date: Jun. 1, 2017

(65) Prior Publication Data
US 2018/0324358 A1    Nov. 8, 2018

(30) Foreign Application Priority Data

Nov. 26, 2015   (JP) ................................. 2015-230909

(51) Int. Cl.
*H04N 5/232*   (2006.01)
*G06T 5/00*    (2006.01)
(Continued)

(52) U.S. Cl.
CPC ......... *H04N 5/23264* (2013.01); *G06T 5/002* (2013.01); *G06T 5/10* (2013.01);
(Continued)

(58) Field of Classification Search
CPC ........... G06T 7/20; G06T 5/002; H04N 5/243; H04N 5/23277; H04N 5/23264; H04N 5/2353
See application file for complete search history.

(56) References Cited

U.S. PATENT DOCUMENTS

| 2004/0160525 | A1* | 8/2004 | Kingetsu | ............ | H04N 5/23248 348/364 |
| 2005/0248660 | A1* | 11/2005 | Stavely | ............ | G03B 39/00 348/208.16 |

(Continued)

FOREIGN PATENT DOCUMENTS

| CN | 1870715 A | 11/2006 |
| JP | 2884262 B2 | 4/1999 |

(Continued)

OTHER PUBLICATIONS

Ryuichi Ogino, "Camera-Shake Locus Detection and Visualization", ITE Technical Report, vol. 31, Issue 14, Feb. 24, 2007.

(Continued)

*Primary Examiner* — Ahmed A Berhan
(74) *Attorney, Agent, or Firm* — Chip Law Group

(57) ABSTRACT

The present disclosure relates to a shooting device, a shooting method, and a program capable of suppressing shooting of an image including large blurring due to motion of a camera such that an image with less blurring may be shot. The camera motion is detected, a distribution degree of a trajectory of the camera motion based on a camera motion detection result is calculated to be compared with a predetermined threshold, and start and finish of exposure is (Continued)

controlled on the basis of a comparison result. The present disclosure may be applied to the shooting device.

19 Claims, 23 Drawing Sheets

(51) Int. Cl.
*G06T 5/10* (2006.01)
*G06T 5/50* (2006.01)
*H04N 5/235* (2006.01)
*G06T 7/20* (2017.01)
*H04N 5/217* (2011.01)
*H04N 5/243* (2006.01)
*G03B 5/00* (2006.01)

(52) U.S. Cl.
CPC ............. *G06T 5/50* (2013.01); *H04N 5/2353* (2013.01); *H04N 5/23258* (2013.01); *G06T 7/20* (2013.01); *G06T 2207/20056* (2013.01)

(56) References Cited

U.S. PATENT DOCUMENTS

2006/0187324 A1* 8/2006 Lin ................... H04N 5/23248
 348/241
2006/0291841 A1 12/2006 Fukumoto et al.

FOREIGN PATENT DOCUMENTS

| | | |
|---|---|---|
| JP | 2004-248021 A | 9/2004 |
| JP | 2006-333061 A | 12/2006 |
| JP | 2007-081487 A | 3/2007 |

OTHER PUBLICATIONS

International Search Report and Written Opinion of PCT Application No. PCT/JP2016/083474, dated Jan. 17, 2017, 09 pages of ISRWO.

Ogino, et al., "Camera-Shake Locus Detection and Visualization", ITE Technical Report, vol. 31, No. 14, Feb. 2007, pp. 21-24.

* cited by examiner

SHOOTING DEVICE AND SHOOTING METHOD TO SUPPRESS BLUR IN AN IMAGE

CROSS REFERENCE TO RELATED APPLICATIONS

This application is a U.S. National Phase of International Patent Application No. PCT/JP2016/083474 filed on Nov. 11, 2016, which claims priority benefit of Japanese Patent Application No. JP 2015-230909 filed in the Japan Patent Office on Nov. 26, 2015. Each of the above-referenced applications is hereby incorporated herein by reference in its entirety.

TECHNICAL FIELD

The present disclosure relates to a shooting device, a shooting method, and a program, and especially relates to the shooting device, the shooting method, and the program capable of suppressing shooting of an image including large blurring due to motion of a camera such that an image with less blurring may be shot.

BACKGROUND ART

Conventionally, a technology is proposed in which angular velocity of motion of a camera during exposure is measured, and the exposure is finished when an angular velocity amount reaches a predetermined amount (refer to Patent Document 1).

In the technology of Patent Document 1, the motion of the camera is obtained as an "angular velocity value" or an "integrated value of angular velocity" thereof, and in a case where the value exceeds a predetermined value, the exposure is finished.

Also, the technology of, when the amount of the camera motion during the exposure reaches a predetermined amount, stopping the exposure earlier than specification, and synthesizing an image group obtained by repeating this by the desired number of times to obtain an image with less blurring and noise is proposed (refer to Patent Document 2).

In the technology of Patent Document 2, in order to shoot an image with predetermined brightness, the exposure is completed at one time when the motion is small, the exposure is performed a plurality of times if the motion is large, and the image with less blurring is shot by synthesizing them. When the exposure time is made short, the blurring decreases but noise increases, so that the noise is reduced by overlapping a plurality of shot images.

CITATION LIST

Patent Document

Patent Document 1: Japanese Patent No. 2884262
Patent Document 2: Japanese Patent Application Laid-Open No. 2007-081487

SUMMARY OF THE INVENTION

Problems to be Solved by the Invention

However, in patent technology 1, it is considered that the integrated value of angular velocity is proportional to a motion amount of a pixel during exposure on an image surface of the camera, but if there is no assumption that motion velocity is constant, a case where the integrated value is large but a blurring amount is small cannot be detected in some cases.

As a result, there is a case in which the exposure is finished even when the image does not blur if the exposure is continued, and an image with less blurring but much noise is shot as a result.

Also, in patent technology 2, in a case where it is tried to actually obtain an image with small blurring, it is necessary to set an allowable motion amount with single exposure small, so that a large number of times of shooting are required and a shooting cost and an image processing operation cost increase.

The present disclosure is achieved in view of such circumstances, and an object thereof is especially to suppress shooting of an image including large blurring due to motion of a camera such that an image with less blurring may be shot.

Solutions to Problems

A shooting device according to one aspect of the present disclosure is a shooting device provided with a camera motion detection unit which detects camera motion, a comparison unit which calculates a distribution degree of a trajectory of the camera motion based on a result of the camera motion detection to compare with a predetermined threshold, and an exposure control unit which controls start and finish of exposure on the basis of a comparison result of the comparison unit.

The comparison unit may calculate a first principal component of covariance as the distribution degree of the camera motion trajectory based on the camera motion detection result to compare with the predetermined threshold.

The comparison unit may generate a point spread function (PSF) image for the camera motion detection result as the distribution degree of the camera motion trajectory based on the camera motion detection result, and perform frequency analysis to compare with the predetermined threshold.

The comparison unit may approximate detection results in a certain range retroactive to predetermined time from current time by a pronominal as the distribution degree of the camera motion trajectory based on the camera motion detection result, extrapolate (extrapolate) motion in future time from the polynomial to measure, and compare with the predetermined threshold.

The camera motion detection unit may include a gyroscope sensor, an acceleration sensor, a geomagnetic sensor, an altitude sensor, a vibration sensor, and a motion capture which tracks a marker of an object from a sub camera for detecting motion of a camera used for imaging different from the camera used for imaging to measure motion.

The exposure control unit may control to finish the exposure when it is regarded that the exposure is longer than minimum exposure time and not longer than maximum exposure time after the exposure is started and blurring is larger than predetermined blurring by the comparison result on the basis of the comparison result of the comparison unit.

The exposure control unit may control to finish the exposure when the maximum exposure time elapses after the exposure is started on the basis of the comparison result of the comparison unit.

When the blurring is regarded to be larger than predetermined blurring by the comparison result at timing at which the exposure is started, the exposure control unit may control to delay the timing at which the exposure is started until the blurring is regarded to be smaller than the predetermined blurring by the comparison result on the basis of the comparison result of the comparison unit.

The exposure control unit may control to finish the exposure in consideration of a signal to noise ratio (SNR) on the basis of the comparison result of the comparison unit.

A noise removal unit which removes noise of an image by integrating a plurality of images taken at a predetermined interval by the camera may be further included.

The noise removal unit may further include a noise removal unit which integrates only an image in which the blurring is smaller than predetermined blurring out of a plurality of images taken by the camera and removes noise of the image.

The noise removal unit may integrate a plurality of images taken by the camera while adding weights according to the exposure time, to remove the noise of the image.

The noise removal unit may integrate a plurality of images taken by the camera while adding weights in consideration of a direction of blurring of each image, to remove the noise of the image.

The noise removal unit may integrate a plurality of images taken by the camera while adding equal weight, to remove the noise of the image.

The noise removal unit may apply fast Fourier transform (FFT) on a plurality of images taken by the camera, collect a component of predetermined amplitude for each frequency component, and apply inverse FFT to generate an image, so that the noise of the image is removed.

The noise removal unit may apply the FFT on a plurality of images taken by the camera, collects a component of amplitude of a maximum value for each frequency component, and apply the inverse FFT to generate an image, so that the noise of the image is removed.

A shooting method according to one aspect of the present disclosure is a shooting method provided with steps of detecting camera motion, calculating a distribution degree of a trajectory of the camera motion on the basis of a result of the camera motion detection to compare with a predetermined threshold, and controlling start and finish of exposure on the basis of a comparison result.

A program according to one aspect of the present disclosure is a program which allows a computer to serve as a camera motion detection unit which detects camera motion, a comparison unit which calculates a distribution degree of a trajectory of the camera motion based on a result of the camera motion detection to compare with a predetermined threshold, and an exposure control unit which controls start and finish of exposure on the basis of a comparison result of the comparison unit.

In one aspect of the present disclosure, camera motion is detected, a distribution degree of the camera motion trajectory based on a detection result of the camera motion is calculated to be compared with a predetermined threshold, and start and finish of exposure is controlled on the basis of a comparison result.

Effects of the Invention

According to one aspect of the present disclosure, it is possible to shoot an image with less blurring by suppressing the shooting of an image including a large blurring due to the motion of the camera.

MODE FOR CARRYING OUT THE INVENTION

Preferred embodiments of the present disclosure will be hereinafter described in detail with reference to the accompanying drawings. Meanwhile, in the present specification and the drawings, the components having substantially the same functional configuration are assigned with the same reference sign, and the description thereof is not repeated.

Also, the description will be given in the following order.
1. First Embodiment
2. Second Embodiment
3. Application

1. First Embodiment

<Conventional Shooting Device>

The technology of Patent Document 1 is to start exposure and start obtaining motion of a camera being a shooting unit as an "angular velocity value" or an "integrated value of angular velocity" thereof, and finish the exposure in a case where the "angular velocity value" or the "integrated value of angular velocity" exceeds a predetermined value.

Herein, it is considered that the integrated value of angular velocity is proportional to a motion amount of a pixel during the exposure on an image surface of the camera, but if there is no assumption that motion velocity is constant, a case where the integrated value is large but a blurring amount is small cannot be detected in some cases.

Figure 1:
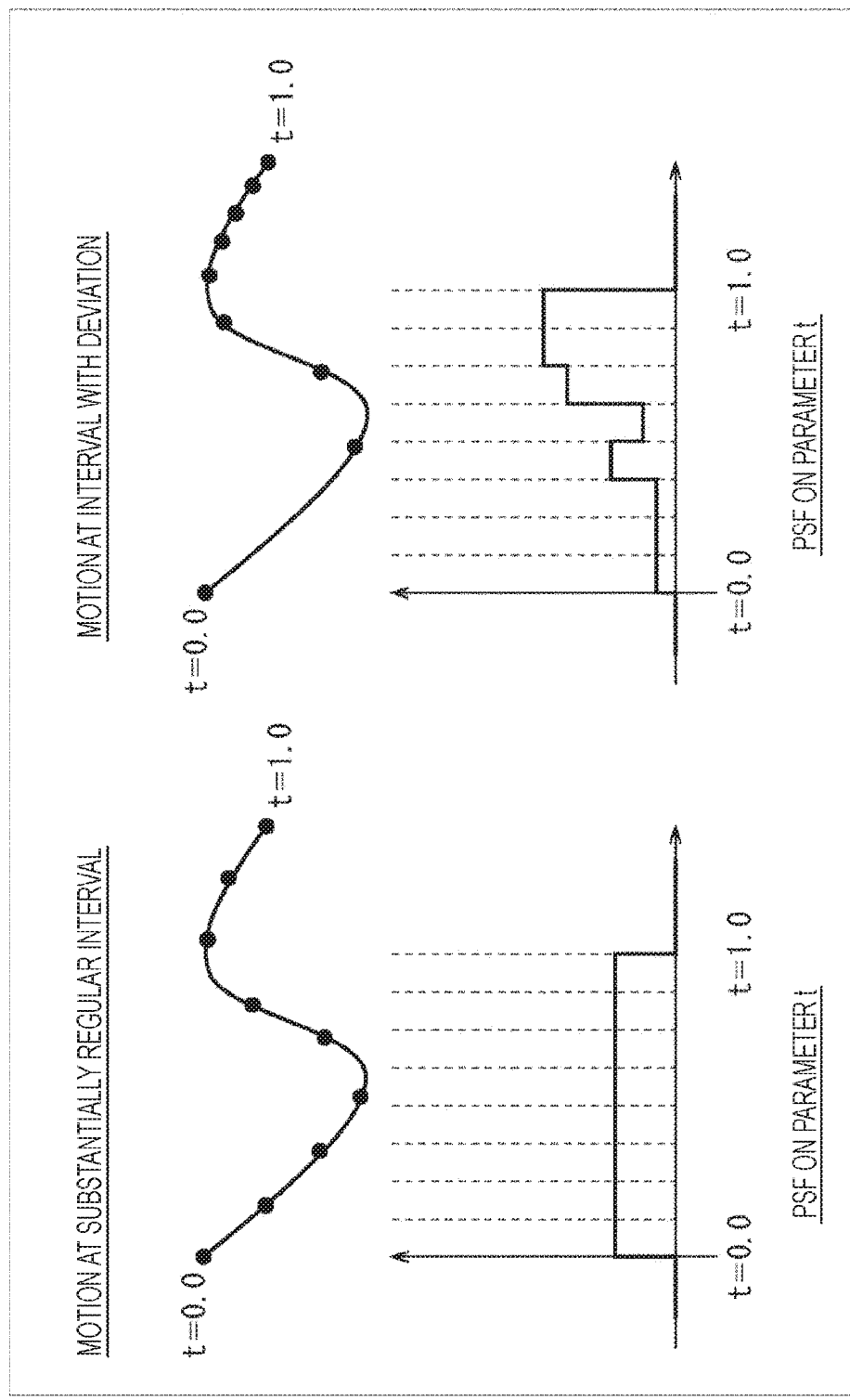
FIG. 1 is a view illustrating that there is a case where blurring occurs and a case where blurring does not occur even if integrated values of angular velocity are the same.

That is, in FIG. 1, a trajectory of motion in a case where there is the motion at a regular interval in a time direction and displacement of a position (black circle) at each timing are illustrated in an upper left part, and a point spread function (PSF) between each displacement is illustrated in a lower left part. In addition, in FIG. 1, an upper right part and a lower right part illustrate a trajectory and a PSF between each displacement in a case where there is the motion in a state in which there is deviation in intervals in the time direction.

Comparing the upper right part and the upper left part in FIG. 1 with each other, the trajectories of motion are identical to each other, so that they are the same in comparison in the integrated value of motion, but it is illustrated that there is deviation in the PSF in the lower right part in FIG. 1 and the image blurring is small as compared with the lower left part in FIG. 1.

That is, in a case in FIG. 1, in a case where the camera motion is evaluated using covariance, it is understood that variance is small and blurring is small in a case of the motion not at a regular interval as compared with a case where there is equal motion at a regular interval in the time direction.

<Configuration Example of First Embodiment>

Therefore, in the shooting device of the present disclosure, the covariance is obtained from the camera motion, and the motion is evaluated on the basis of a first principal component of the covariance in a motion trajectory point sequence.

Figure 2:
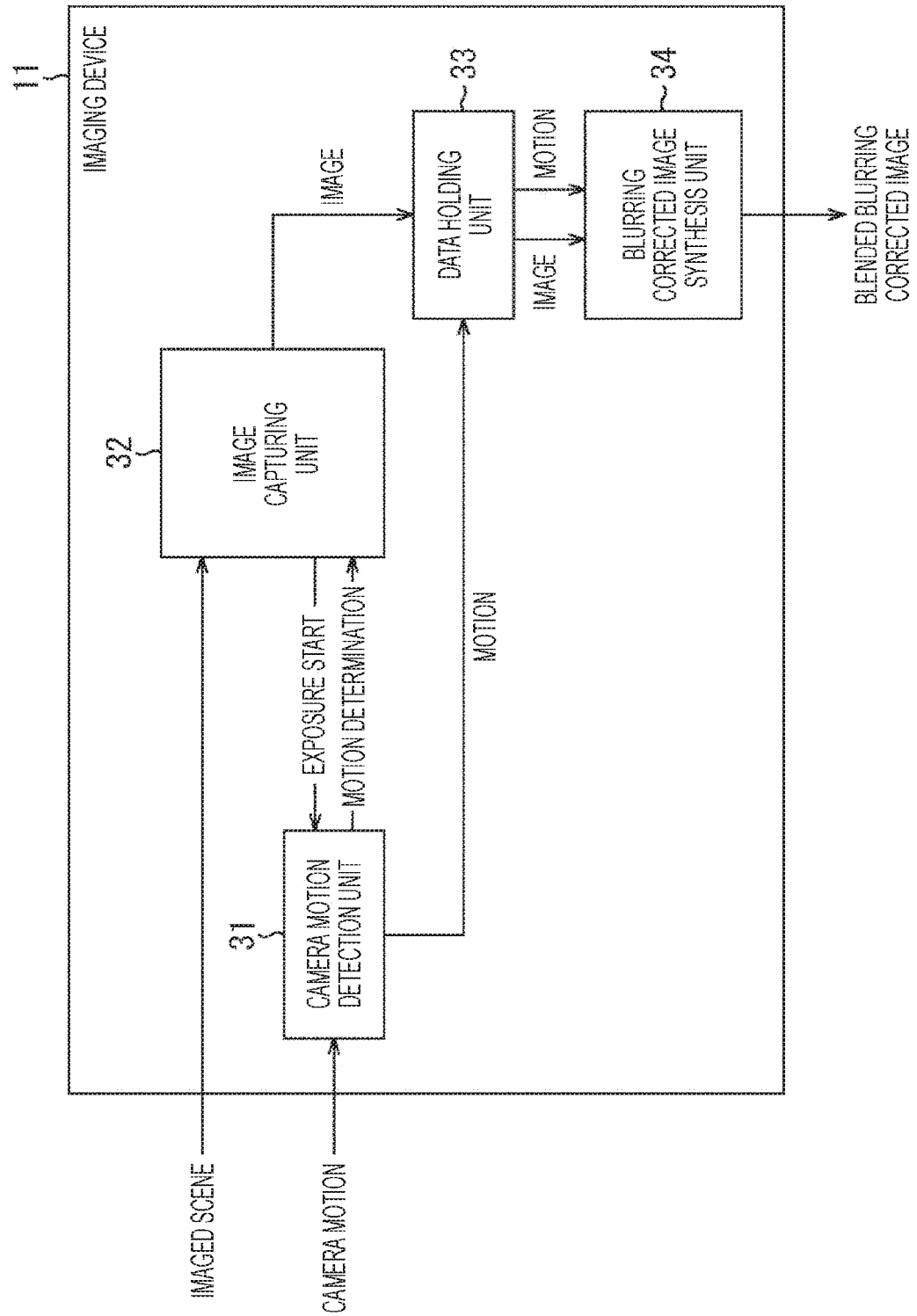
FIG. 2 is a view illustrating a configuration example of a first embodiment of a shooting device to which the technology of the present disclosure is applied.

FIG. 2 is a block diagram illustrating a configuration example of the first embodiment of a shooting device 11 according to the present disclosure.

The shooting device (camera) 11 in FIG. 2 includes an image shooting unit 32 which shoots a scene, a camera motion detection unit 31 which detects motion of the shooting device 11, a data holding unit 33 which stores the shot image and measured camera motion, and a blurring corrected image synthesis unit 34 which reads a plurality of stored images and camera motions and synthesizes them while correcting the blurring.

The camera motion detection unit 31 receives an exposure starting signal from the image shooting unit 32, measures the camera motion during the exposure, determines whether the motion of the shooting device (camera) 11 exceeds a predetermined value, and outputs a determination result to the image shooting unit 32. Also, the camera motion detection unit 31 transmits camera motion data while shooting a frame image to the data holding unit.

The image shooting unit 32 exposes a scene to be shot to measure image data, transmits exposure starting timing to the camera motion detection unit 31, and receives the motion determination result from the camera motion detection unit 31. Then, the image shooting unit 32 determines to finish the exposure according to the motion determination result, performs gain correction on the shot image according to the exposure time, and outputs the corrected image data to the data holding unit 33.

The data holding unit 33 receives the frame image from the image shooting unit 32, receives the camera motion data of the frame image from the camera motion detection unit 31, and holds the data. The data holding unit 33 outputs a predetermined number of frame images and the camera motion data which are recorded to the blurring corrected image synthesis unit.

The blurring corrected image synthesis unit 34 receives the image and the camera motion data from the data holding unit 33, aligns the respective frame images on the basis of the camera motion data, and performs selective blend processing on all the frame images. As a result, a blended blurring corrected image with reduced noise is shot.

<Configuration Example of Camera Motion Detection Unit>

Figure 3:
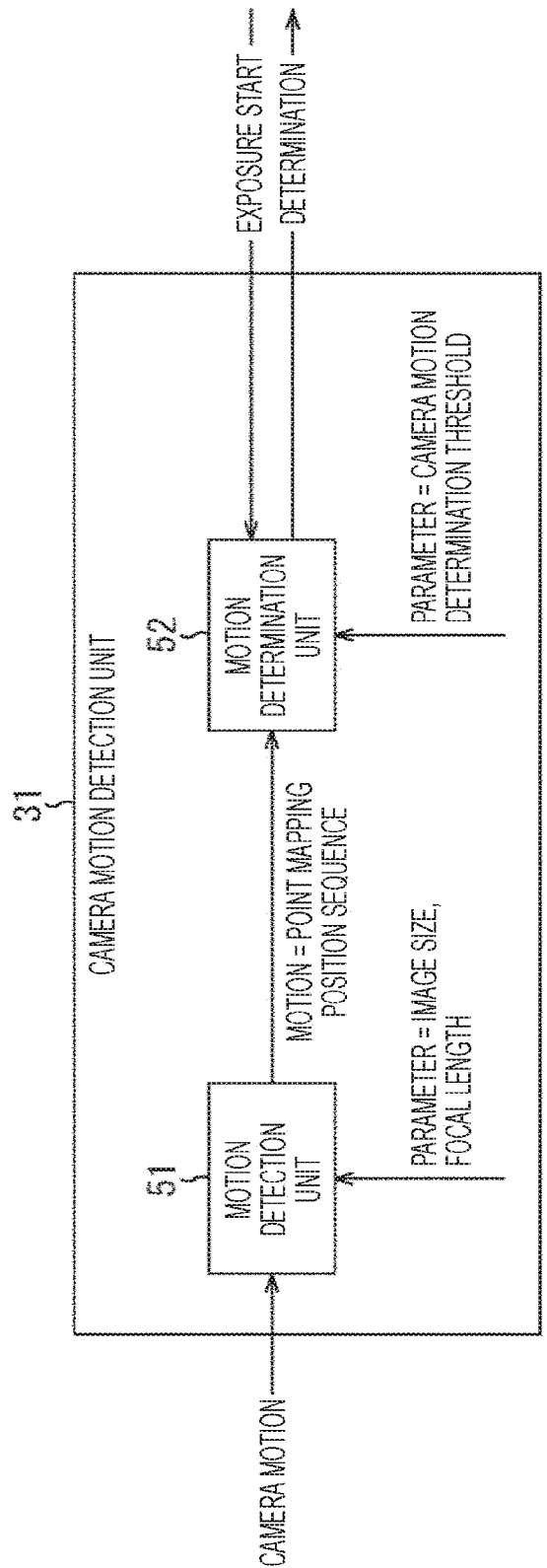
FIG. 3 is a view illustrating a configuration example of a camera motion detection unit of the shooting device in FIG. 2.

Next, with reference to FIG. 3, a configuration example of the camera motion detection unit 31 will be described.

The camera motion detection unit 31 is provided with a motion detection unit 51 and a motion determination unit 52. The motion detection unit 51 periodically measures the camera motion during the exposure, calculates a motion position point sequence on the image surface of the camera using camera parameters such as an image size and a focal length, and outputs the point sequence to the motion determination unit 52. The motion determination unit 52 receives the motion position point sequence from the motion detection unit 51, determines whether the blurring due to the motion falls within an allowable amount using a predetermined camera motion determination threshold parameter, and outputs a determination result to the image shooting unit 32.

The motion detection unit 51 measures the camera motion using, for example, a gyroscope sensor which measures the angular velocity. Meanwhile, a method of measuring by the motion detection unit 51 is not limited to that by the gyroscope sensor and may be performed by anything as long as the camera motion may be known. That is, when measuring the camera motion, the camera motion detection unit 31 may use an acceleration sensor which measures acceleration, a geomagnetic sensor which measures the north direction, an altitude sensor which measures altitude from atmospheric pressure, a vibration sensor which measures vibration, a motion capture which tracks a marker of an object from an external camera and measures motion and the like, for example, in place of the gyroscope sensor.

<Camera Motion Detection Processing>

Figure 4:
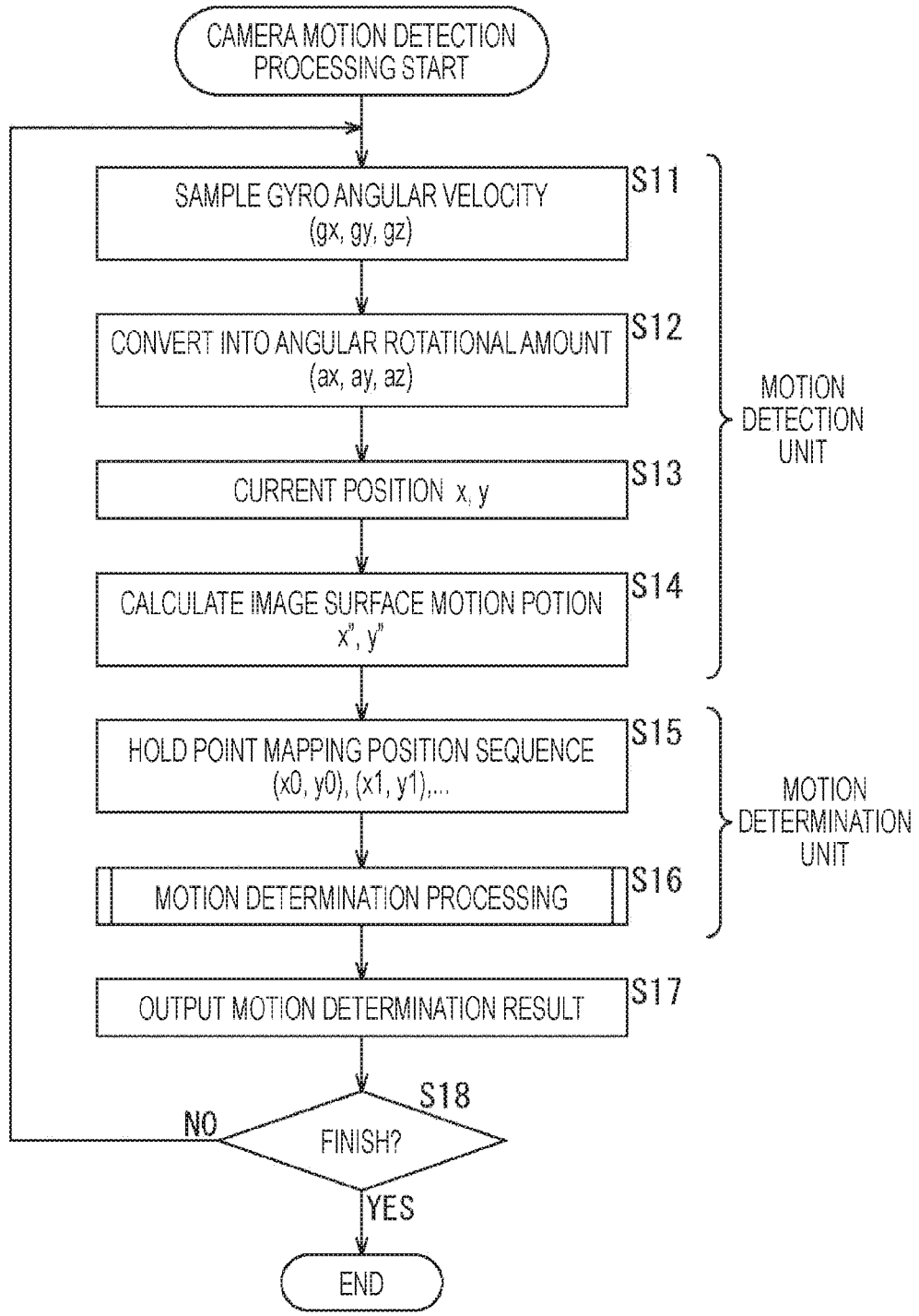
FIG. 4 is a flowchart illustrating camera motion detection processing by the camera motion detection unit in FIG. 3.

Next, camera motion detection processing by the camera motion detection unit 31 will be described with reference to a flowchart in FIG. 4. Meanwhile, since the camera motion detection processing may be performed by measuring the angular velocity using the gyroscope sensor, it is assumed that the camera motion is regarded as rotational motion.

At step S11, the motion detection unit 51 measures a rotational motion component out of the camera motion as angular velocity (gx, gy, gz) using the gyroscope sensor at a predetermined time interval. The time interval is, for example, one millisecond interval and the like, and the motion detection unit 51 including the gyroscope sensor and the like samples the angular velocity at a predetermined time interval.

At step S12, the motion detection unit 51 integrates the angular velocity and converts the same to an angular rotational amount (ax, ay, az).

At step S13, the motion detection unit 51 obtains current position coordinates (x, y). Initial values of the current position coordinates (x, y) are set to, for example, the center (0, 0) on the camera image surface, and thereafter, a position calculated in immediately preceding processing is sequentially made the current position coordinates (x, y).

At step S14, the motion detection unit 51 rotationally moves the current position coordinates (x, y) using the angular rotational amount (ax, ay, az).

Rotational motion is obtained as matrix multiplication using Euler angles αβγ as in following mathematical expression (1). For example, α, β, and γ represent the angular rotational amounts in a pitch direction, a yaw direction, and a roll direction, respectively. x, y represent the current coordinate position, and z represents a distance to the image surface for which the focal length is used.

[Mathematical Expression 1]

$$\begin{pmatrix} x' \\ y' \\ z' \end{pmatrix} = \begin{pmatrix} \cos\alpha\cos\beta\cos\gamma - \sin\alpha\sin\gamma & -\cos\alpha\cos\beta\sin\gamma - \sin\alpha\cos\gamma & \cos\alpha\sin\beta \\ \sin\alpha\cos\beta\cos\gamma + \cos\alpha\sin\gamma & -\sin\alpha\cos\beta\sin\gamma + \cos\alpha\cos\gamma & \sin\alpha\sin\beta \\ -\sin\beta\cos\gamma & \sin\beta\sin\gamma & \cos\beta \end{pmatrix} \begin{pmatrix} x \\ y \\ z \end{pmatrix} \quad (1)$$

Then, in order to correctly calculate the blurring on the image surface, the motion detection unit 51 divides x' and y' by z' to obtain x" and y" as the coordinates after the rotational motion as expressed by following mathematical expression (2).

[Mathematical Expression 2]

$$\begin{pmatrix} x'' \\ y'' \end{pmatrix} = \begin{pmatrix} x'/z' \\ y'/z' \end{pmatrix} \quad (2)$$

Meanwhile, mathematical expression (1) described above may be expressed by following mathematical expression (3) when expressed by a general expression.

[Mathematical Expression 3]

$$\begin{pmatrix} x_i \\ y_i \\ 1 \end{pmatrix} = \text{Rotate} \begin{pmatrix} x_{i-1} \\ y_{i-1} \\ 1 \end{pmatrix} \quad (3)$$

Herein, i represents a time series relationship of x and y. Also, Rotate represents a rotation formula.

At step S15, the motion detection unit 51 sequentially performs such mapping position calculation to obtain a point mapping position sequence (x0, y0), (x1, y1), ..., (xi, yi) and outputs the same to the motion determination unit 52.

The motion determination unit 52 obtains the point mapping position sequence (x0, y0), (x1, y1), ..., (xi, yi) to hold.

At step S16, the motion determination unit 52 executes motion determination processing and performs calculation with this point mapping position sequence (xi, yi) as an input. Meanwhile, the motion determination processing will be described later in detail.

At step S17, the motion determination unit 52 outputs, for example, 0 when the blurring (blurring) is equal to or smaller than a threshold and 1 when the blurring (blurring) is equal to or larger than the threshold according to the motion determination result.

Herein, the motion is determined by obtaining the first principal component of the covariance of the point mapping position sequence and performing threshold determination on the first principal component. The covariance matrix is a 2×2 matrix with Σij as a component as expressed by following mathematical expression (4), in which Xi represents an x coordinate xi of the point mapping position sequence, Yi represents a y coordinate yi of the point mapping position sequence, and μi and μj represent expected values thereof.

[Mathematical Expression 4]

$$\sum_{ij} = E[(X_i - \mu_i)(X_j - \mu_j)] \quad (4)$$

The first principal component is obtained by singular value decomposition of the covariance matrix. The first principal component indicates magnitude of maximum variance of the covariance matrix which is considered to represent magnitude of maximum blurring.

At step S18, the motion determination unit 52 determines whether the processing is finished on the basis of whether the blurring is equal to or larger than the threshold or the maximum exposure time elapses as the motion determination result, and in a case where it is regarded that the processing is not finished, the procedure returns to step S11 and subsequent processes are executed.

Also, at step S18, in a case where the blurring is equal to or larger than the threshold or the maximum exposure time elapses as the motion determination result, the camera motion detection processing is finished.

By the above-described processing, the camera motion is sequentially detected and the camera motion determination result is continuously output.

<First Configuration Example of Motion Determination Unit>

Next, with reference to a block diagram in FIG. 5, a first configuration example of the motion determination unit 52 will be described. The motion determination unit 52 includes a covariance matrix eigenvalue calculation unit 71 and a threshold calculation unit 72.

The covariance matrix eigenvalue calculation unit 71 obtains the first principal component (=maximum eigenvalue) by the above-described method with the point mapping position sequence as an input and outputs the same to the threshold calculation unit 72.

The threshold calculation unit 72 receives the first principal component from the covariance matrix eigenvalue calculation unit 71, performs threshold processing using a deterioration threshold as a parameter, and outputs a calculation result as the motion determination result.

Although image deterioration occurs due to the blurring, if the exposure time is controlled to be short so as to eliminate the blurring, noise increases. Therefore, in order to optimally prevent the deterioration, it is necessary to perform threshold calculation in consideration of both the blurring and noise.

Figure 5:
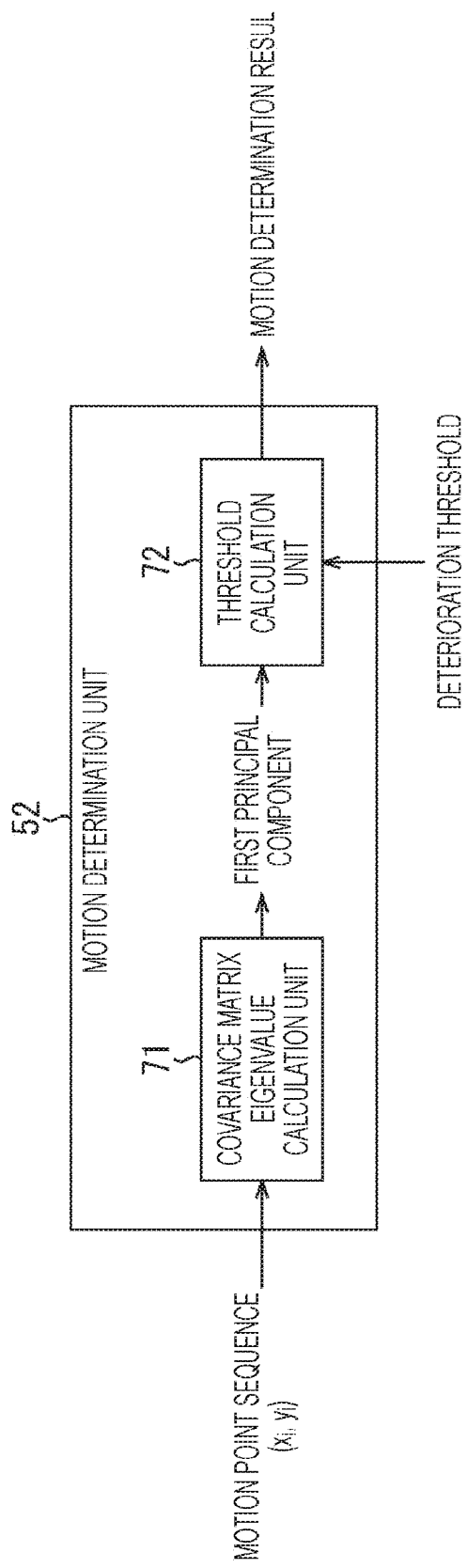
FIG. 5 is a view illustrating a first configuration example of a motion determination unit of the camera motion detection unit in FIG. 3.

<Motion Determination Processing by Motion Determination Unit in FIG. 5>

Figure 6:
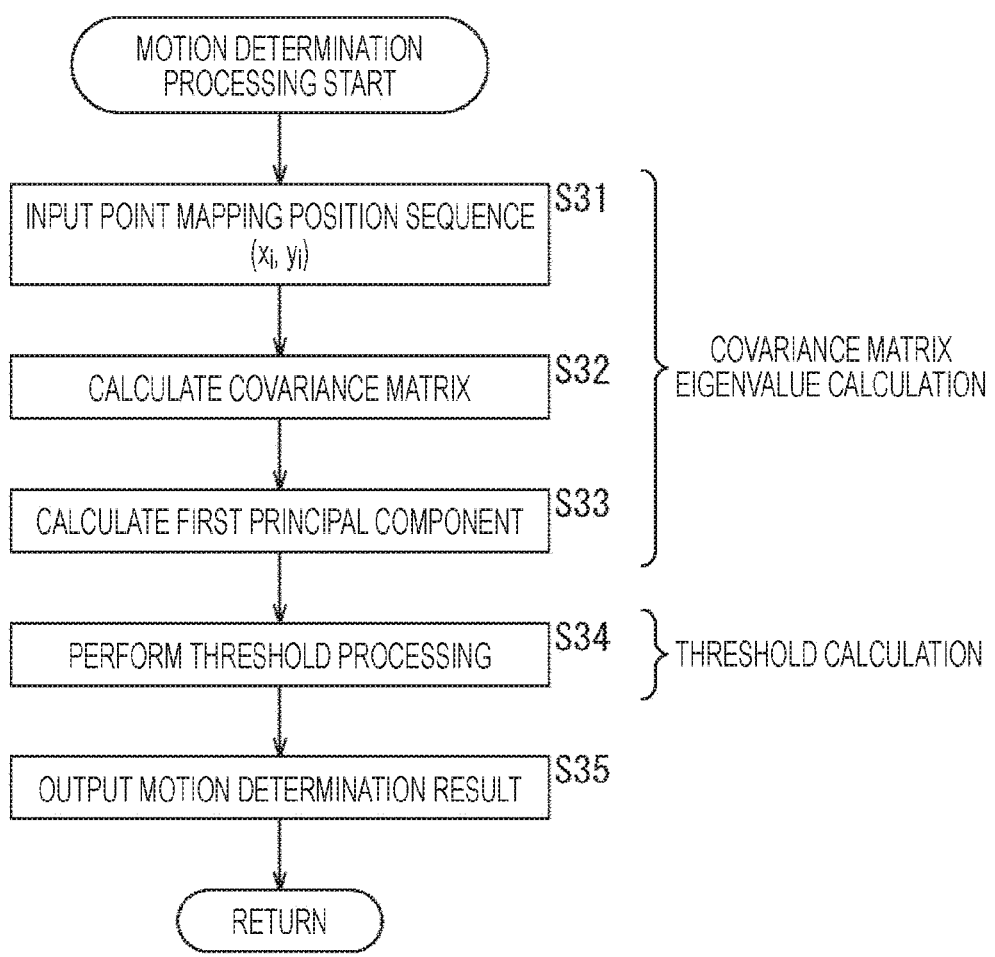
FIG. 6 is a flowchart illustrating motion determination processing by the motion determination unit in FIG. 5.

The motion determination processing by the motion determination unit 52 in FIG. 5 will be next described with reference to a flowchart in FIG. 6

At step S31, the covariance matrix eigenvalue calculation unit 71 receives an input of the point mapping position sequence (xi, yi).

At step S32, the covariance matrix eigenvalue calculation unit 71 calculates the covariance matrix expressed by mathematical expression (4).

At step S33, the covariance matrix eigenvalue calculation unit 71 calculates the first principal component and supplies the same to the threshold calculation unit 72.

At step S34, in a case where magnitude of the first principal component, that is, the maximum blurring is smaller than the deterioration threshold, the threshold calculation unit 72 outputs 0 as a determination result indicating that the blurring is smaller than the deterioration threshold, and in a case where the blurring is larger than the deterioration threshold, this outputs 1 as the determination result indicating that the blurring is larger than the deterioration threshold.

At step S35, the threshold calculation unit 72 outputs the determination result.

Herein, the deterioration threshold used by the threshold calculation unit 72 will be described.

A degree of the blurring may be approximated by the magnitude of the first principal component of the covariance of the point mapping position sequence, and shot noise and thermal noise which are principal causes of the noise may be approximated by Gaussian distribution having luminance dependency. Therefore, in the present disclosure, an evaluation expression taking the blurring and noise into account is defined, and a value thereof is subjected to the threshold processing.

A noise dispersion amount N(x) is modeled in a linear relationship with luminance x, for example, as expressed by following mathematical expression (5).

[Mathematical Expression 5]

$$N(x) = ax + b \quad (5)$$

Herein, a and b represent parameters of a model.

Furthermore, an evaluation of a deterioration degree score C of the image due to the blurring and noise is obtained using following mathematical expression (6).

[Mathematical Expression 6]

$$C = \gamma \times \exp\left(-\frac{N(x)}{x\sigma^2}\right) \times B \quad (6)$$

Herein, the dispersion amount N(x) represents noise dispersion according to the luminance, σ represents a parameter for controlling an influence degree of the noise dispersion, x represents the luminance, B represents the first principal component of blurring, and γ represents an adjustment parameter.

According to mathematical expression (6), while the exposure time is short, the luminance x is small, so that the influence of the noise dispersion N is large and an exp evaluation value approaches 0, and it is allowed even if the blurring B is large to a certain extent. When the exposure time extends and the influence of the noise dispersion N becomes smaller, the exp evaluation value approaches 1 and the magnitude of the blurring B is directly evaluated. In this manner, by simultaneously evaluating the noise and blurring to make a weight variable, it is possible to determine the exposure time for optimally controlling the image deterioration.

The threshold processing is executed using the deterioration degree score C thus obtained as the deterioration threshold, and the motion determination result for determining whether to continue or finish the exposure is obtained.

<Second Configuration Example of Motion Determination Unit>

In the above-description, the example is described in which the covariance matrix is obtained from the point mapping position sequence and the first principal component is calculated to be compared with the threshold, thereby determining whether the motion is larger than a predetermined threshold; however, it is also possible to obtain a point spread function (PSF) from the point mapping position sequence, and analyzes a frequency thereof to analyze the motion determination result.

Figure 7:
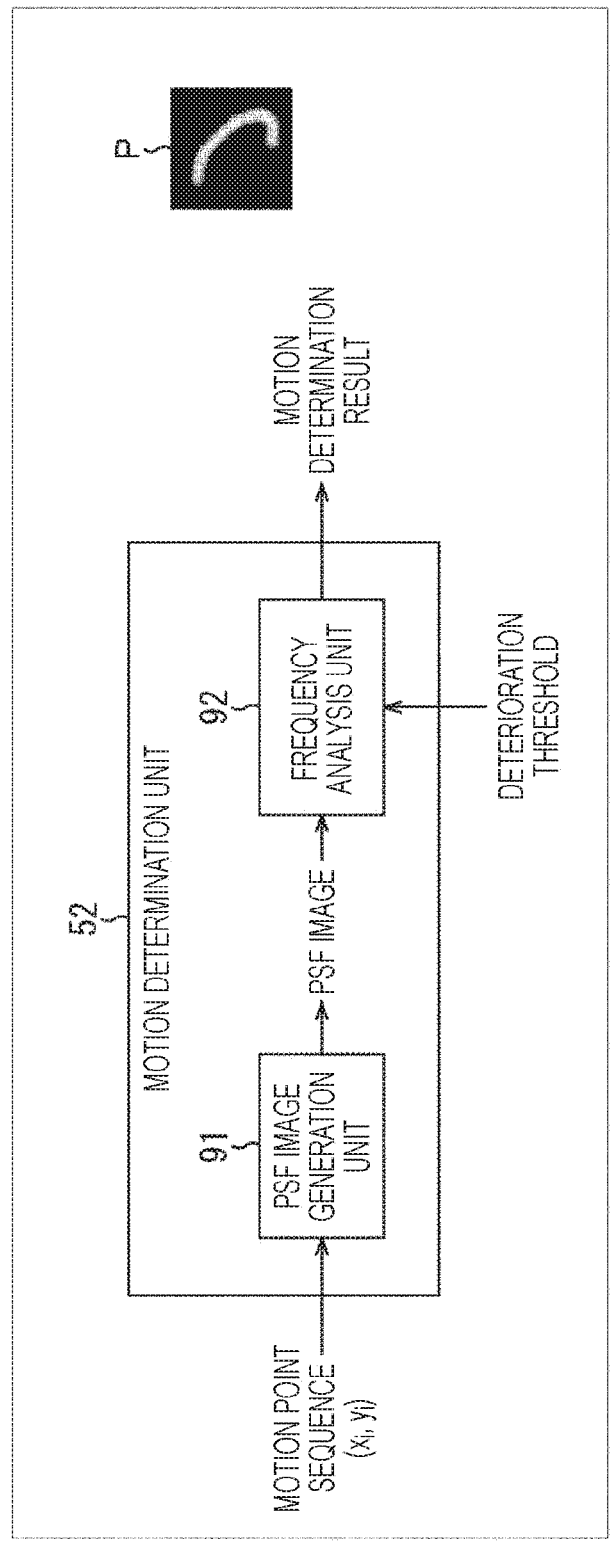
FIG. 7 is a view illustrating a second configuration example of a motion determination unit of the camera motion detection unit in FIG. 3.

FIG. 7 illustrates a configuration example of the motion determination unit 52 in which the PSF is obtained from the point mapping position sequence, the frequency thereof is analyzed, and the motion determination result is obtained.

The motion determination unit 52 in FIG. 7 is provided with a PSF image generation unit 91 and a frequency analysis unit 92.

The PSF image generation unit 91 generates a PSF image from the point mapping position sequence and outputs the same to the frequency analysis unit 92. The frequency analysis unit 92 receives the PSF image to perform frequency analysis, calculates the motion determination result depending on whether a frequency component is equal to or smaller than a certain threshold, and outputs the same.

The PSF image is a gray image obtained by sequentially rendering a motion point sequence (point mapping position sequence) to a small image as a polygonal line, for example, an image P in a right part in FIG. 7. In a case where there is no motion, this is a point image. In the frequency analysis, the frequency components obtained by performing FFT on this PSF image are plotted one-dimensionally from low frequency to high frequency and it is determined whether each frequency component is equal to or higher than a predetermined value.

In a case where the motion is large, a high frequency component drops in the PSF image, so that it is possible to calculate the motion determination result by focusing on the high frequency component equal to or higher than a certain value and comparing with the deterioration threshold whether the integrated value of the components is not smaller than a certain value.

<Motion Determination Processing by Motion Determination Unit in FIG. 7>

Figure 8:
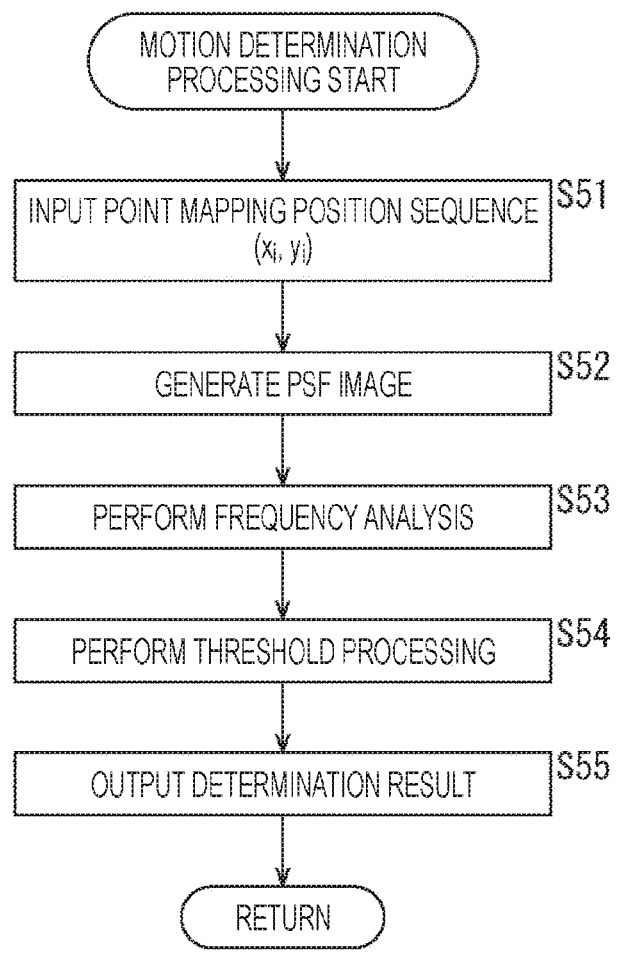
FIG. 8 is a flowchart illustrating motion determination processing by the motion determination unit in FIG. 7.

The motion determination processing by the motion determination unit 52 in FIG. 7 will be next described with reference to a flowchart in FIG. 8.

At step S51, the PSF image generation unit 91 receives the input of the point mapping position sequence (xi, yi).

At step S52, the PSF image generation unit 91 generates the PSF image and outputs the same to the frequency analysis unit 92.

At step S53, the frequency analysis unit 92 performs the frequency analysis by one-dimensionally plotting the frequency components obtained by performing the FFT on the PSF image from low frequency to high frequency.

At step S54, the frequency analysis unit 92 plots and performs threshold determination depending on whether each frequency component is equal to or higher than a predetermined value. More specifically, in a case where the motion is large, the high frequency component drops in the PSF image, so that the motion determination result is calculated by focusing on the high frequency component equal to or higher than a certain value and comparing with the deterioration threshold whether the integrated value of the components is not smaller than a certain value.

As a result, in a case where the magnitude of the blurring is smaller than a predetermined threshold, the frequency analysis unit 92 outputs 0 as the determination result indicating that the blurring is smaller than the threshold, and in a case where the magnitude of the blurring is larger than a predetermined threshold, this outputs 1 as the determination result indicating that the blurring is larger than the threshold.

At step S55, the frequency analysis unit 92 outputs the determination result.

By the above-described processing, it becomes possible to output the motion determination result by obtaining the PSF image from the point mapping position sequence (xi, yi) and performing the frequency analysis.

<Configuration Example of Image Shooting Unit>

Figure 9:
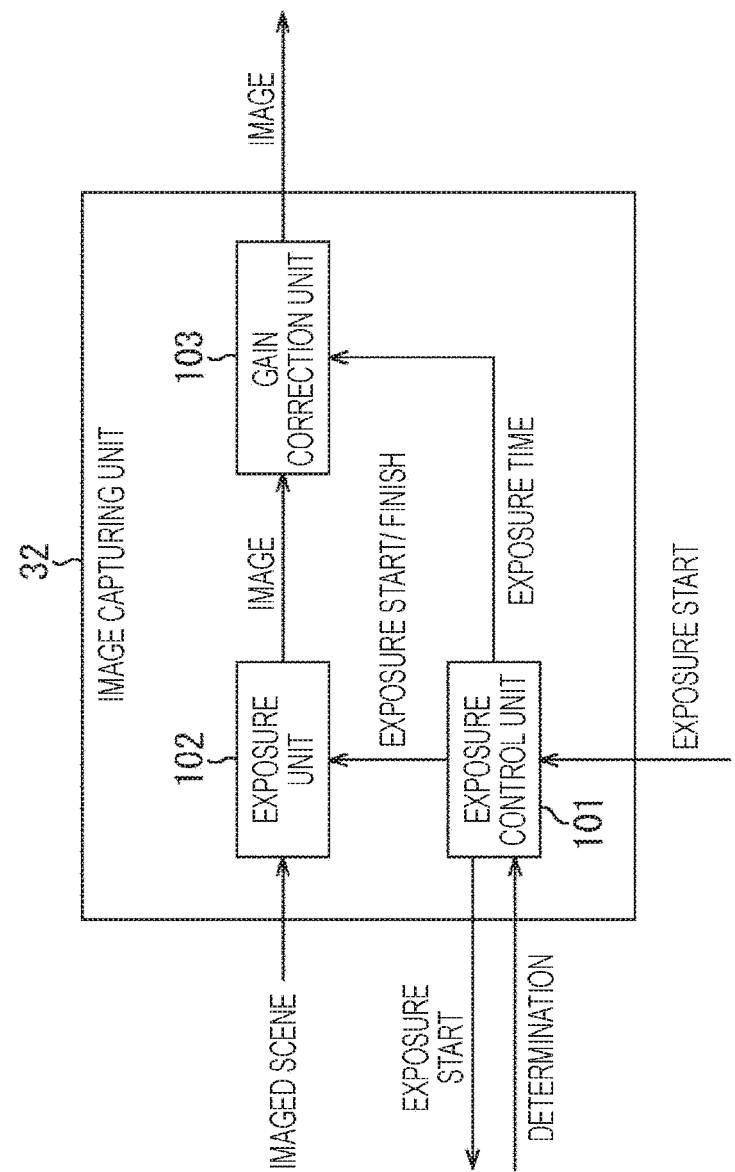
FIG. 9 is a view illustrating a configuration example of an image shooting unit of the shooting device in FIG. 2.

Next, a configuration example of the image shooting unit 32 will be described with reference to a block diagram in FIG. 9.

The image shooting unit 32 is provided with an exposure control unit 101, an exposure unit 102, and a gain correction unit 103.

The exposure unit 102 exposes the scene to be shot and outputs the image data. In further detail, the exposure unit 102 exposes the scene to be shot and outputs the image data to the gain correction unit 103. The exposure unit 102 receives control to start and finish the exposure from the exposure control unit 101.

The exposure control unit 101 controls to start and finish the exposure. In further detail, the exposure control unit 101 receives an exposure starting signal such as pressing of a shutter button of the camera, and controls the exposure unit 102 to start the exposure. Also, the exposure control unit 101 notifies the camera motion detection unit 31 of the exposure starting timing. After the exposure is started, this receives the motion determination result from the camera motion detection unit 31, and if the exposure time measured by an internal timer is equal to or longer than minimum exposure time set in advance and equal to or shorter than the maximum exposure time, this controls to finish the exposure of the exposure unit 102 when the motion determination result indicates that motion larger than predetermined motion is detected (when the determination result is 1). Also, when the exposure time is equal to or longer than the maximum exposure time, the exposure control unit 101 controls to finish the exposure of the exposure unit 102. Furthermore, the exposure control unit 101 transmits the exposure time from the exposure start until the exposure is finished to the gain correction unit 103.

The gain correction unit 103 corrects the gain of the image data. More specifically, the gain correction unit 103 outputs image data obtained by multiplying the image data received from the exposure unit 102 by gain in accordance with the exposure time.

<Shooting Processing>

Figure 10:
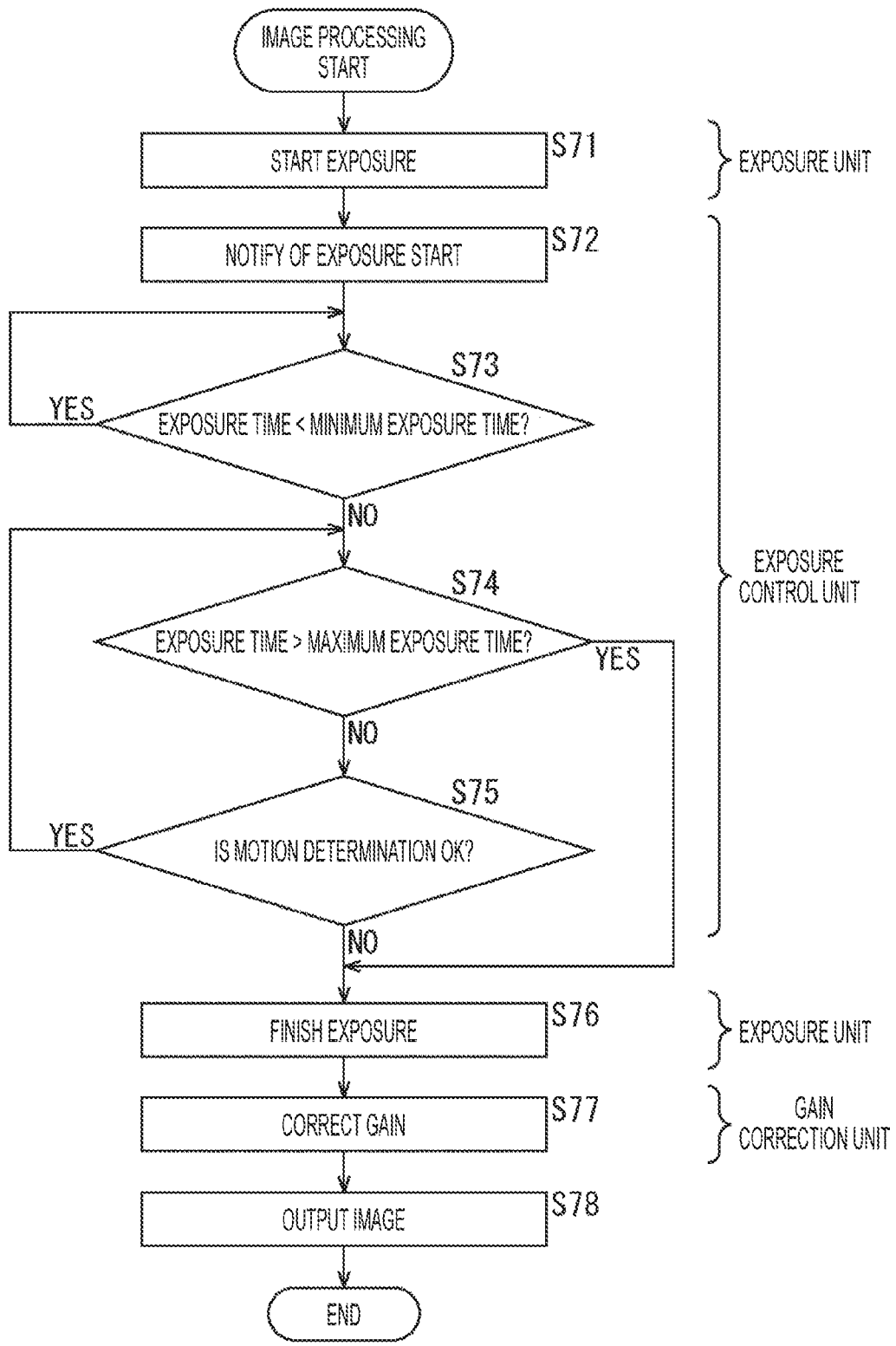
FIG. 10 is a flowchart illustrating shooting processing by the image shooting unit in FIG. 9.

Shooting processing by the image shooting unit 32 will be next described with reference to a flowchart in FIG. 10.

At step S71, the exposure control unit 101 transmits the exposure starting signal to the exposure unit 102, and the exposure unit 102 starts the exposure.

At step S72, the exposure control unit 101 transmits the exposure start to the camera motion detection unit 31.

At step S73, the exposure control unit 101 measures the exposure time using the internal timer, determines whether the minimum exposure time set in advance elapses, and continues measuring the time if the exposure time is shorter than the minimum exposure time. Then, at step S73, in a case where it is regarded that the minimum exposure time set in advance elapses, the procedure shifts to step S74.

At step S74, the exposure control unit 101 measures the exposure time using the internal timer and determines whether the maximum exposure time set in advance elapses. At step S74, in a case where the exposure time is shorter than the maximum exposure time, the procedure shifts to step S75.

At step S75, the exposure control unit 101 determines whether the motion determination result from the camera motion determination unit 31 is smaller than the threshold of the blurring and it is regarded that there is no blurring. In a case where it is regarded that this is no blurring at step S75, the procedure shifts to step S74.

That is, if the exposure time does not reach the maximum exposure time at step S74, and exposure completion (large blurring) is not received at step S75 as the motion determination result, the processes at steps S74 and S75 are repeated, and determination operation by the motion determination result and the determination of the maximum exposure time are continued. That is, the exposure continues during this time.

In a case where it is regarded that the exposure time reaches the maximum exposure time at step S74, or in a case where it is regarded that the motion determination result is large at step S75, the procedure shifts to step S76.

At step S76, the exposure control unit 101 transmits exposure completion to the exposure unit 102, and the exposure unit 102 completes the exposure of the scene to be shot and supplies the image data to the gain correction unit 103. At that time, the exposure control unit 101 supplies information regarding the exposure time in the exposure unit 102 to the gain correction unit 103.

At step S77, the gain correction unit 103 corrects the image data by multiplying the same by gain according to the exposure time received from the exposure control unit 101.

At step S78, the gain correction unit 103 outputs the image data the gain of which is corrected.

Figure 11:
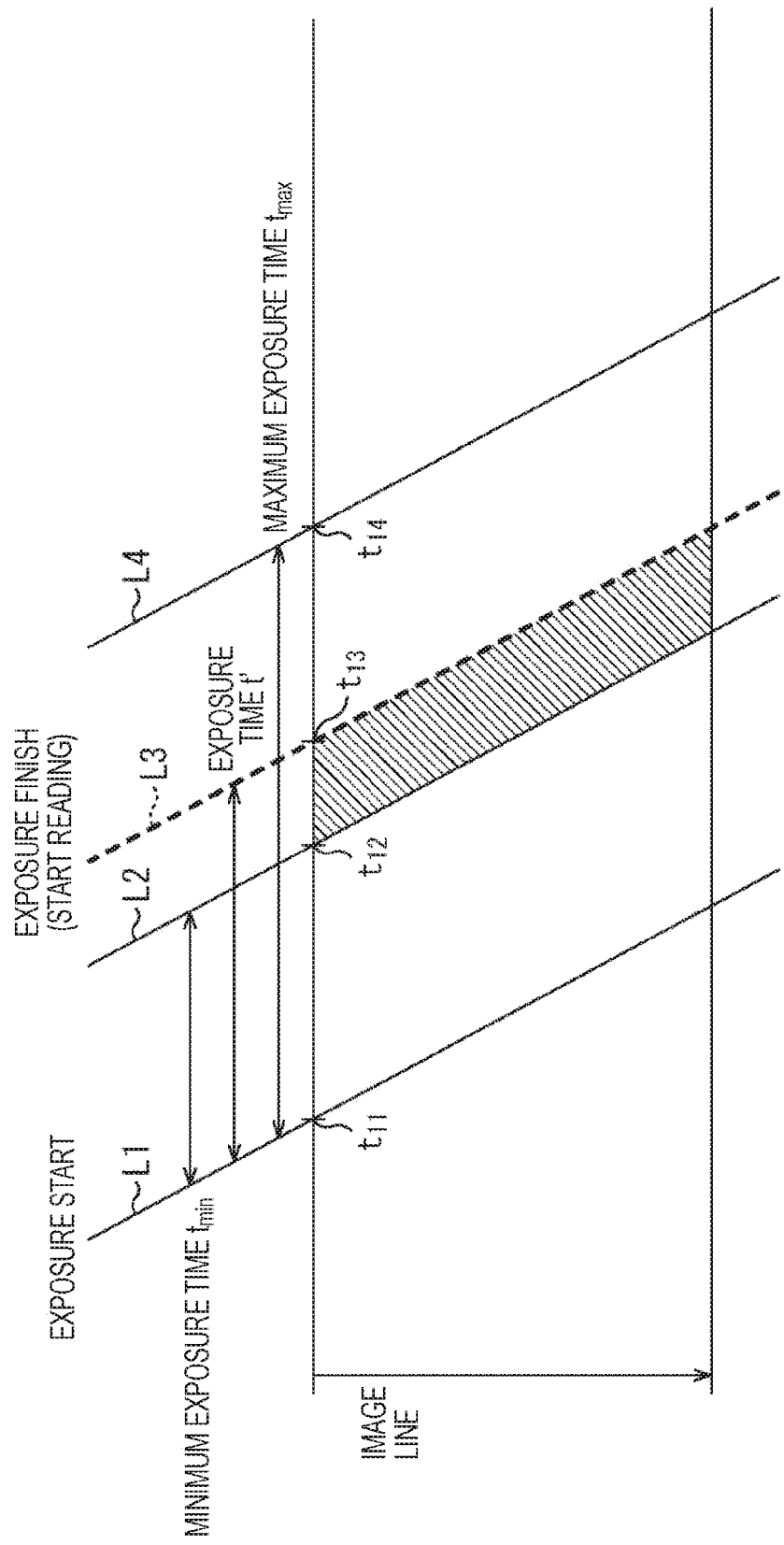
FIG. 11 is a view illustrating exposure time in the shooting processing by the image shooting unit in FIG. 9.

That is, as illustrated in FIG. 11, in a case where reading of a topmost line of an image starts at time t11, the exposure is necessarily continued until time t12 at which the minimum exposure time tmin elapses, and after that, the exposure is continued until it is notified that the blurring is large by the motion determination result until time t14 up to maximum exposure time tmax according to the motion determination result. In FIG. 11, it is illustrated that it is notified that the blurring is large by the motion determination result, and the exposure is finished at time t13.

Meanwhile, in FIG. 11, the image line is separated from the topmost line in a downward direction in the drawing. Therefore, it is illustrated that it delays as it approaches a lower line on the basis of the exposure starting time t11, and the exposure starting time substantially delays along an exposure starting line L1. Similarly, since minimum exposure time tmin also delays as it approaches a lower line on the basis of the exposure starting line L1, this is set to delay along a minimum exposure line L2 on the basis of time t12.

Similarly, the maximum exposure time tmax is also set to delay along a maximum exposure line L4 on the basis of time t14. In addition, in FIG. 11, since the exposure is finished at time t13 on the topmost line, an exposure finishing line L3 is set according to the lower line on the basis of time t13. That is, in FIG. 11, a shaded area indicates a time period in which the exposure is longer than the minimum exposure time tmin.

Meanwhile, although the exposure is started irrespective of the determination result from the camera motion detection unit 31 when the timing comes in the description above, it may also be considered that the blurring becomes large in the determination result from the camera motion detection unit 31 at the starting timing, and if the exposure is started from the state, there might be a case where the image with large blurring is shot with the minimum exposure time tmin.

Therefore, the exposure control unit 101 may change the exposure starting timing by using the determination result received from the camera motion detection unit 31. For example, in a case where the camera motion is large though the exposure starting timing comes, it is possible to reduce the blurring by delaying to start the exposure after the camera motion stops.

In this case, the exposure unit 102 outputs the exposure starting signal for starting the motion determination at timing before the exposure starts, and refers to the motion determination result at actual exposure starting timing. At that time, if the blurring is large according to the motion determination result, the exposure control unit 101 may delay the exposure start of the exposure unit 102 and start the exposure of the exposure unit at the time when the blurring disappears from the motion determination result.

Furthermore, in a case where it is detected that the blurring is large by the motion determination result within the minimum exposure time tmin from the exposure start, that is, in a case where it is detected that the blurring is large in a state in which the exposure time is short and a sufficient signal to noise ratio (SNR) cannot be obtained even if the exposure is finished at that timing, the exposure unit 102 may temporarily finish the exposure to discard the exposure result so far and expose again such that the sufficient SNR may be obtained after the blurring disappears.

It is also possible to control to start and finish the exposure while predicting future motion from the motion measured until predetermined time. For example, motion data in a certain range retroactive to predetermined time from the current time is approximated by a polynomial, motion in future is measured by extrapolation (extrapolation) by the polynomial, and time at which the motion exceeds a threshold is predicted. By using such prediction, it becomes possible to measure the exposure finishing timing, which is determined on the upper line of the image, on a lower end line of a screen, and the shooting may be controlled such that the blurring of an entire image falls within predetermined blurring.

<Configuration Example of Data Holding Unit>

Figure 12:
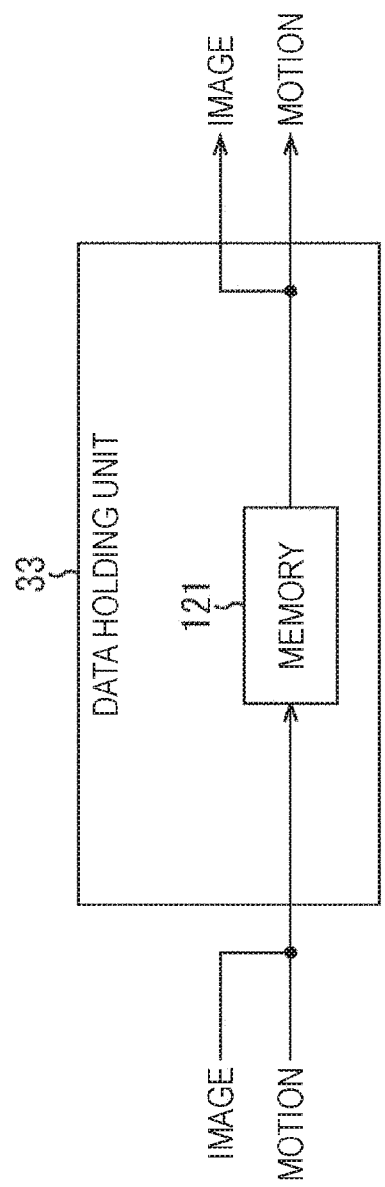
FIG. 12 is a view illustrating a configuration example of a data holding unit of the shooting device in FIG. 2.

Next, a configuration example of the data holding unit 33 will be described with reference to a block diagram in FIG. 12.

The data holding unit 33 including a memory 121 receives the images and motions, associates them with each other, and store data of a plurality of frames in the internal memory 121, and outputs the data of the images and motions to the blurring corrected image synthesis unit 34 on a subsequent stage.

<Configuration Example of Blurring Corrected Image Synthesis Unit>

Figure 13:
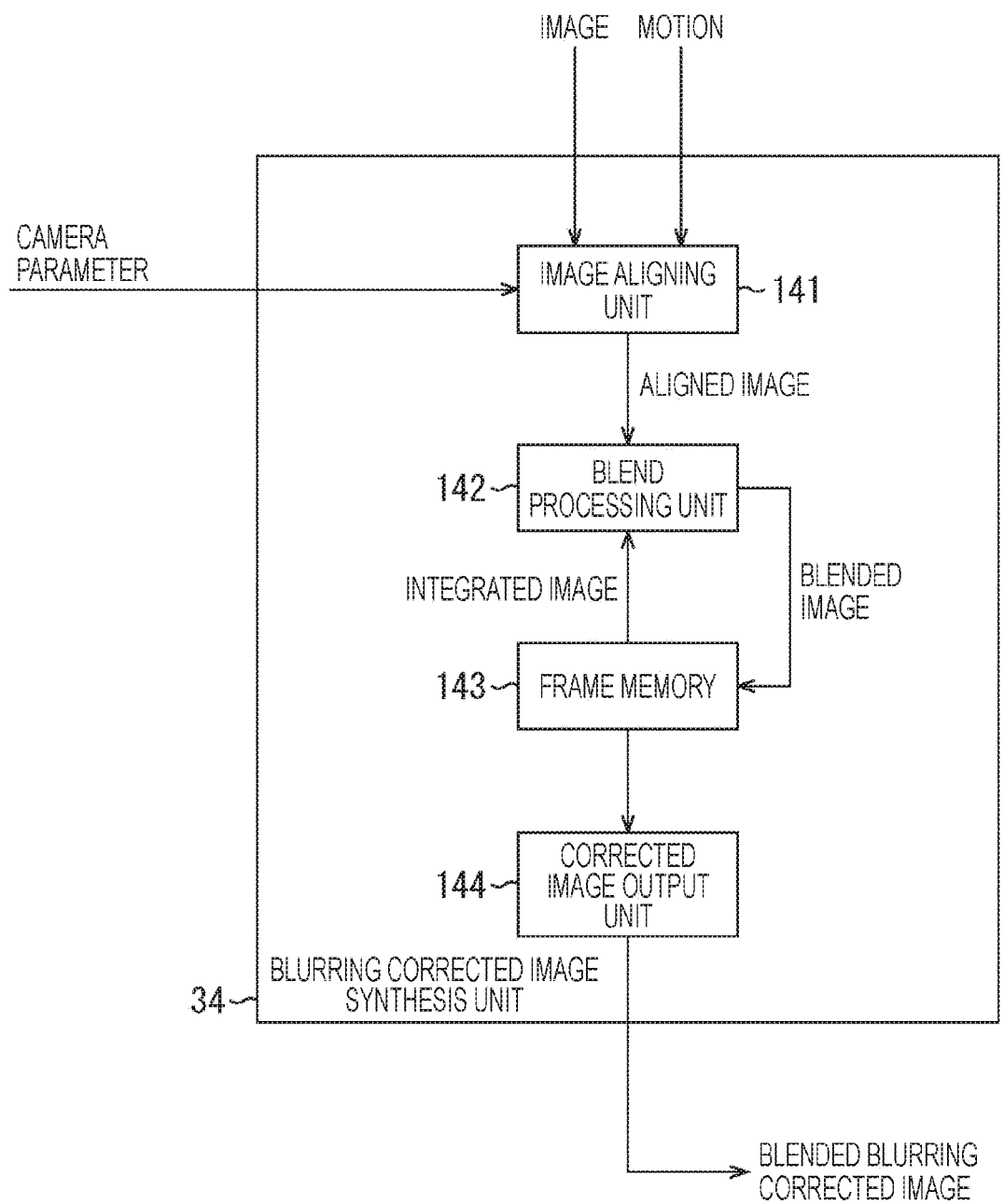
FIG. 13 is a view illustrating a configuration example of a blurring corrected image synthesis unit of the shooting device in FIG. 2.

Next, with reference to a block diagram in FIG. 13, a configuration example of the blurring corrected image synthesis unit 34 will be described.

The blurring corrected image synthesis unit 34 is provided with an image alignment unit 141 which calculates an alignment parameter required for adjusting a position of a subsequent image to a position based on a top image, thereby deforming the image received from the data holding unit 33, a blend processing unit 142 which receives the aligned image and adds to blend the same to an integrated image in the middle of the integration, a frame memory 143 which receives the blended image to store and supplies the integrated image to the blend processing unit 142, and a corrected image output unit 144 which receives the integrated image from the frame memory 143 to output.

The image alignment unit 141 receives the motion data from the memory 121 of the data holding unit 33 and calculates the alignment parameter for aligning the subsequent image to the position of the top image by using the camera parameter.

The angular rotational amount of the camera between the frame images obtained by the gyroscope sensor is input to the image alignment unit 141, for example, as the motion data. Canceling the motion by the camera rotational motion to align corresponds to obtaining the motion amount of each pixel position of the image, so that this may be realized by using the Euler angle rotation matrix of mathematical expression (1) described above.

Herein, x, y represent each pixel position of the image, and z represents the focal length given by the camera parameter. The number of vertical and horizontal pixels of the image, image center, and a pixel size are also given as the camera parameters. In this manner, the image aligned with the top image is output.

The blend processing unit 142 blends the aligned image and the integrated image in the middle of the integration stored in the frame memory 143, updates the integrated image, and delivers the same to the frame memory 143. As a simplest method, it is possible to integrate while setting the same weight to the respective frame images to be integrated; for example, in a case where eight images are integrated, the weight of each image is ⅛.

As another integrating method, for example, there is a method in which an inverse number of the exposure time of each frame image is set as a weight. Assuming that the blurring amount of each frame image is suppressed to a certain amount or smaller by the above-described motion detecting means, it is considered that the amount of noise of the image decreases according to the exposure time, so that the noise may be further reduced by adopting the weight which increases as the exposure time is longer. Furthermore, it is also possible to discard an image inappropriate as the image to be integrated having a large blurring amount, and extract only the image appropriate as the image to be integrated with a small blurring amount to integrate.

More specifically, it is calculated using following mathematical expression (7).

[Mathematical Expression 7]

$$w(i) = \frac{t(i)}{\sum_{i=0}^{n} t(i)} \tag{7}$$

Herein, i represents a frame image number. w(i) represents a weight of the frame image i. A denominator is the sum of the exposure time of all the frame images and a numerator is exposure time t(i) of the frame image i.

<First Processing Example of Blurring Corrected Image Synthesis Processing>

Figure 14:
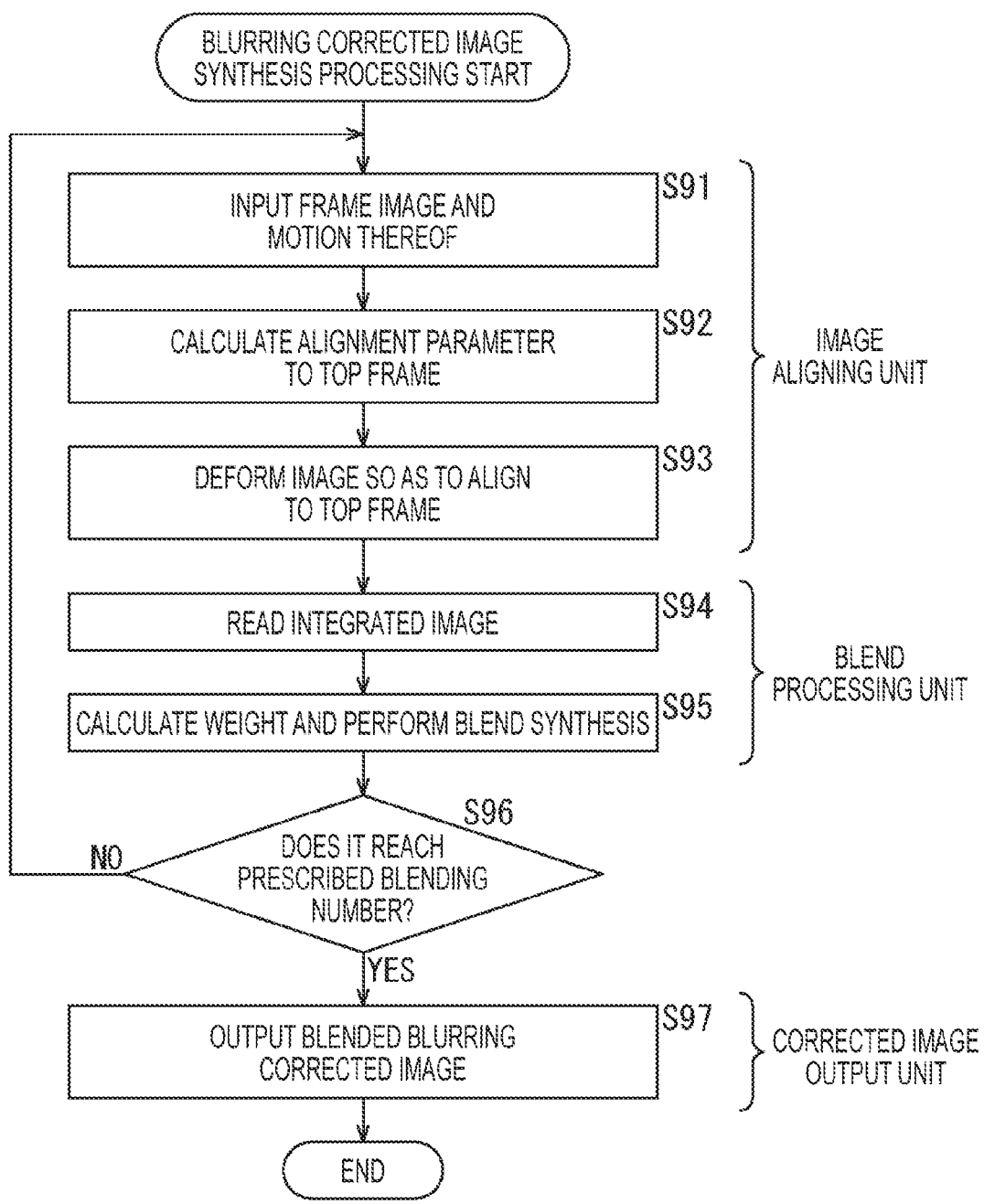
FIG. 14 is a flowchart illustrating a first processing example of blurring corrected image synthesis processing by the blurring corrected image synthesis unit in FIG. 13.

Next, with reference to a flowchart in FIG. 14, a first processing example of blurring corrected image synthesis processing will be described.

At step S91, the image alignment unit 141 receives the frame image and the corresponding motion data from the memory 121 of the data holding unit 33.

At step S92, the image alignment unit 141 calculates the alignment parameter to the top frame. That is, the image alignment unit 141 calculates a corresponding position of each pixel position of the current frame image in the top image.

At step S93, the image alignment unit 141 deforms the current frame image on the basis of position correspondence between the current frame image and the top frame image.

At step S94, the blend processing unit 142 reads the integrated image from the frame memory 143.

At step S95, the blend processing unit 142 blends the deformed current frame image and the integrated image on the basis of the calculated weight.

At step S96, the blend processing unit 142 determines whether it reaches a prescribed number of blending, and in a case where it is regarded that it does not reach, the procedure returns to step S91. That is, the next frame image and motion are input, and the processes at steps S91 to S96 are repeated until it reaches the prescribed number of blending. Then, in a case where it is regarded that it reaches the prescribed number of blending at step S96, the procedure shifts to step S96.

At step S97, the blend processing unit 142 outputs the current integrated image as the blended blurring corrected image and finishes the processing By the above-described processing, the aligned images with the adjusted shapes are integrated to be blended, and the blurring is corrected. In addition, at that time, it is possible to further correct the blurring by adding weights according to the exposure time of the images to be integrated and integrating.

<Second Processing Example of Blurring Corrected Image Synthesis Processing>

Although an example of correcting the blurring by integrating the aligned images is described above, it is also possible to apply a suggested method of obtaining the image with less blurring by capturing a plurality of images with different directions of blurring and different sizes and selectively synthesizing components without the blurring from the respective images as disclosed in "Burst Deblurring: Removing Camera Shake Through Fourier Burst Accumulation", Mauricio Delbracio.

Figure 15:
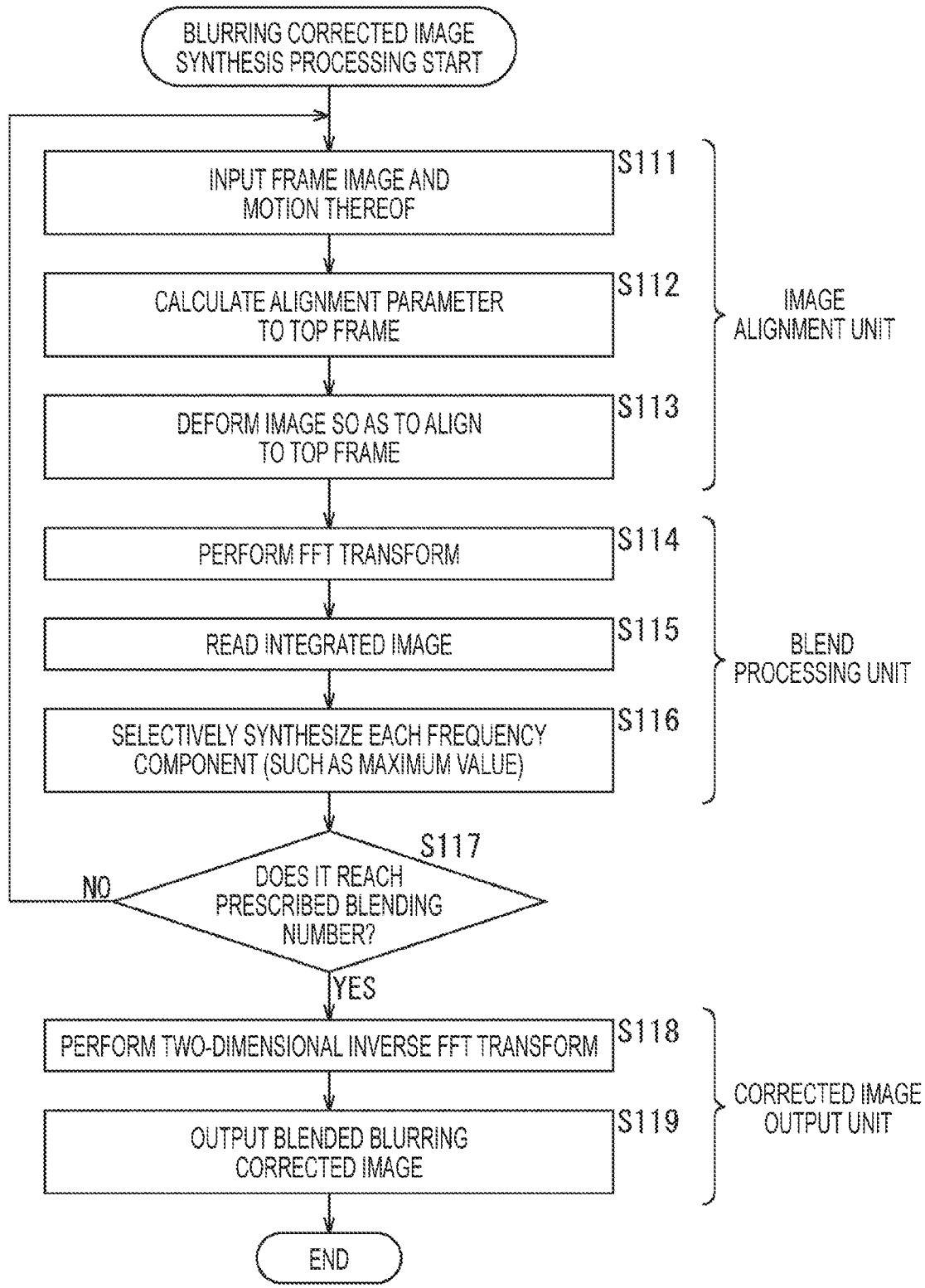
FIG. 15 is a flowchart illustrating a second processing example of blurring corrected image synthesis processing by the blurring corrected image synthesis unit in FIG. 13.

Therefore, with reference to a flowchart in FIG. 15, the blurring corrected image synthesis processing in a case of shooting a plurality of images with different directions of blurring and different sizes and selectively synthesizing the components without the blurring from the respective images, thereby reducing the blurring is described as a second processing example.

This is a method of obtaining the image with less blurring by synthesizing a plurality of images by aligning each image to the top image position and then converting the same to a frequency space, preferentially selecting a component with large amplitude in each frequency in the frequency space, and collecting the components to convert the same to an image space to return.

That is, at step S111, the image alignment unit 141 receives the frame image and the corresponding motion data from the memory 121 of the data holding unit 33.

At step S112, the image alignment unit 141 calculates the alignment parameter to the top frame. That is, the image alignment unit 141 calculates a corresponding position of each pixel position of the current frame image in the top image.

At step S113, the image alignment unit 141 deforms the current frame image on the basis of the position correspondence between the current frame image and the top frame image.

At step S114, the blend processing unit 142 applies fast Fourier transform (FFT) to the current frame and converts the same to frequency components.

At step S115, the blend processing unit 142 reads the integrated image in a state converted to the frequency component from the frame memory 143.

At step S116, the blend processing unit 142 selectively synthesizes, for example, a maximum value of each frequency component.

At step S117, the blend processing unit 142 determines whether it reaches the prescribed number of blending, and in a case where it is regarded that it does not reach the number, the procedure returns to step S111. That is, the next frame image and motion are input, and the processes at steps S111 to S117 are repeated until it reaches the prescribed number of blending. Then, in a case where it is regarded that it reaches the prescribed number of blending at step S117, the procedure shifts to step S118.

At step S118, the corrected image output unit 144 applies two-dimensional inverse FFT to the blended image in which it reaches the number of blending.

At step S119, the corrected image output unit 144 outputs the current integrated image as the blended blurring corrected image and finishes the procedure.

By the above-described processing, the aligned image is subjected to the FFT, the component of large amplitude of each frequency component is selectively synthesized, and this is subjected to the inverse FFT to be blended, so that it becomes possible to correct the blurring.

At that time, it is optimal to shoot the respective images with different manners of blurring (motion amounts, motion directions), and if it is possible to control the exposure such that the image blurring is different, it is possible to obtain a suitable blended image set. That is, if information in the blurring direction of the already shot image is obtained, the blurring direction insufficient for recovering the original image without blurring is known, and it is possible to control the exposure time such that the blurring is not excessive in the insufficient blurring direction. This control is also applicable to the shooting device 11 of the present disclosure.

Figure 16:
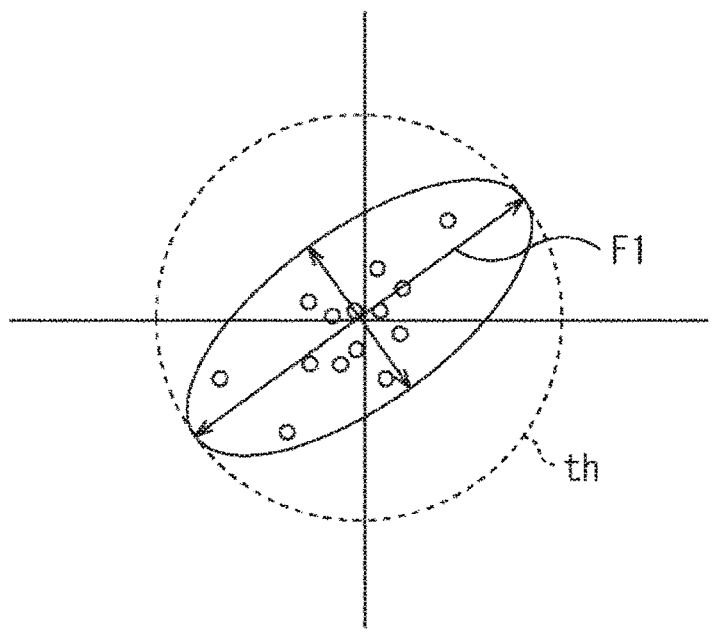
FIG. 16 is a view illustrating a relationship between a first principal component of a motion blurring amount and a camera motion determination threshold.

Determining whether the first principal component of the covariance matrix exceeds the threshold is equivalent to determining whether a first principal component vector F1 falls within a circle th having the camera motion determination threshold as a diameter as illustrated in FIG. 16.

In order to perform the exposure control in which the blurring in a desired direction is suppressed by changing the threshold for each blurring direction in the shooting device 11 of the present disclosure, the threshold processing is performed by changing the camera motion determination threshold anisotropically in each direction. This makes it possible to control the exposure such that the manner of blurring of the image differs and obtain a suitable blended image set.

Figure 17:
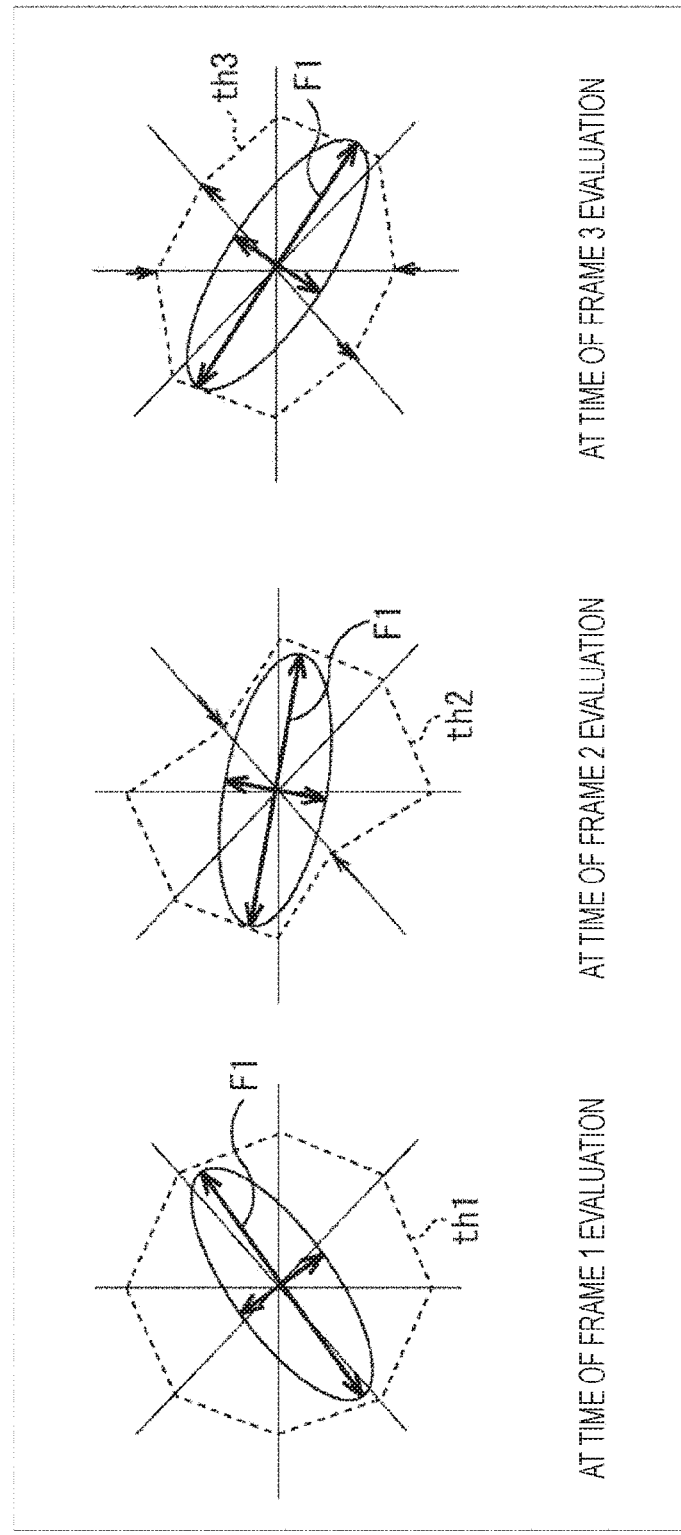
FIG. 17 is a view illustrating a relationship between the first principal component of the motion blurring amount and the camera motion determination threshold.

As illustrated in FIG. 17, a camera motion threshold th1 is herein set in four directions of vertical, horizontal, and diagonal directions. At the time of the top frame of frame 1 motion determination, this is an isotropic value. In the frame 1, the first principal component F1 is a vector in a direction close to the right diagonal direction, but since this is within the threshold th1, the motion determination result is regarded as having no large motion and no blurring.

When determining a frame 2, a threshold th2 obtained by changing the camera motion determination threshold for each direction is set in accordance with the motion blurring result of the frame 1. In the threshold th2, the threshold in the right diagonal direction is made small. In the frame 2, the first principal component F1 is a vector in the direction close to the horizontal direction, but since this is within the threshold th2, the motion determination result is regarded as having no large motion and no blurring.

When determining a frame 3, a threshold th3 obtained by changing the camera motion determination threshold is set in accordance with the motion blurring result up to the frame 2. In the threshold th3, the threshold is made larger than the threshold th2 in the right diagonal direction, and the threshold is made smaller than the threshold th2 in the vertical direction. In the frame 3, the first principal component F1 is a vector in a direction close to the left diagonal direction, but since this is within the threshold th3, the motion determination result is regarded as having no large motion and no blurring.

Figure 18:
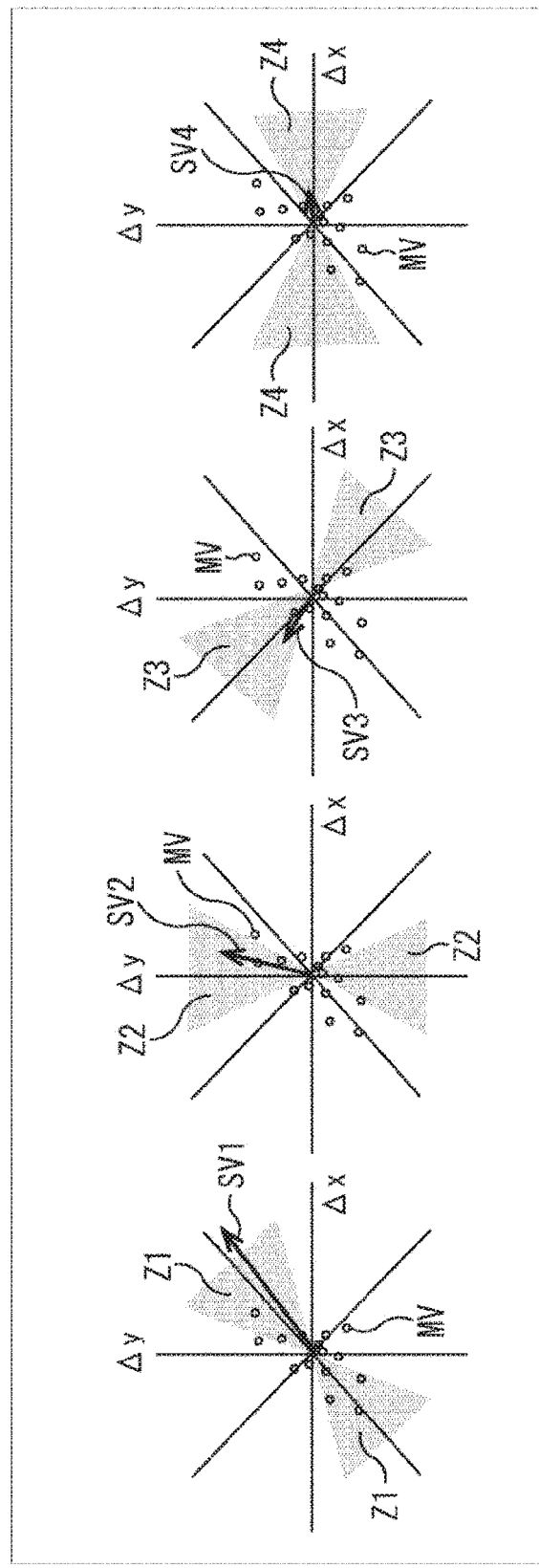
FIG. 18 is a view illustrating an integrated vector in each motion direction.

The threshold in each direction is determined by calculating a histogram of a motion vector MV(Δx, Δy) between each point of the point mapping position sequence. As illustrated in FIG. 18, the histograms in four directions are calculated from a motion vector MV set. White circles in the drawing are obtained by plotting the motion vectors MV. Those included in each of effective regions Z1 to Z4 in each direction defined by gray in the drawing are collected to be integrated, and lengths of integrated vectors SV1 to SV4 which are the integrated motion vectors are made histogram values in the respective directions.

In a leftmost part in FIG. 18, the integrated vector SV1 having a histogram value indicated by black bold arrow is obtained by integrating the motion vectors in the effective region Z1 in the right diagonally upward direction and the left diagonally downward direction (by inverting a sign as for the vector in the left downward direction). The effective region is defined with a certain angular spread with a direction of interest as the center.

In a second part from the left in FIG. 18, the integrated vector SV2 having a histogram value indicated by black bold arrow is obtained by integrating the motion vectors in the effective region Z2 in the upward direction and the downward direction (by inverting a sign as for the vector in the downward direction).

In a third part from the left in FIG. 18, the integrated vector SV3 having a histogram value indicated by black bold arrow is obtained by integrating the motion vectors in the effective region Z3 in the left diagonally upward direction and the right diagonally downward direction (by inverting a sign as for the vector in the right downward direction).

In a rightmost part in FIG. 18, the integrated vector SV4 having a histogram value indicated by black bold arrow is obtained by integrating the motion vectors in the effective region Z4 in the leftward direction and the rightward direction (by inverting a sign as for the vector in the leftward direction).

Meanwhile, the effective region may be that by a pattern other than this, or it is also possible that there is overlap with the adjacent direction, or there is a gap.

Since in-plane blurring of the image is included much in the direction in which the histogram value is large, a threshold is set so that the blurring in this blurring direction becomes smaller in subsequent frame shooting. Therefore, a threshold for each direction expressed by following mathematical expression (8) is calculated.

[Mathematical Expression 8]

$$Th(d) = Th \times \min\left(1.0, \gamma \times \frac{h(d)}{\sum_{d=0}^{D} h(d)}\right) \qquad (8)$$

Herein, d represents a direction, including vertical, horizontal, right diagonally upward, right diagonally downward in the example in FIG. 18. Th represents a threshold being a parameter set by a user. γ represents an adjustment parameter, the smaller the value, the smaller the threshold, strictly limiting the blurring in that direction. h(d) represents the histogram value in the direction d.

<Motion Determination Processing Using Threshold for Each Direction>

Figure 19:
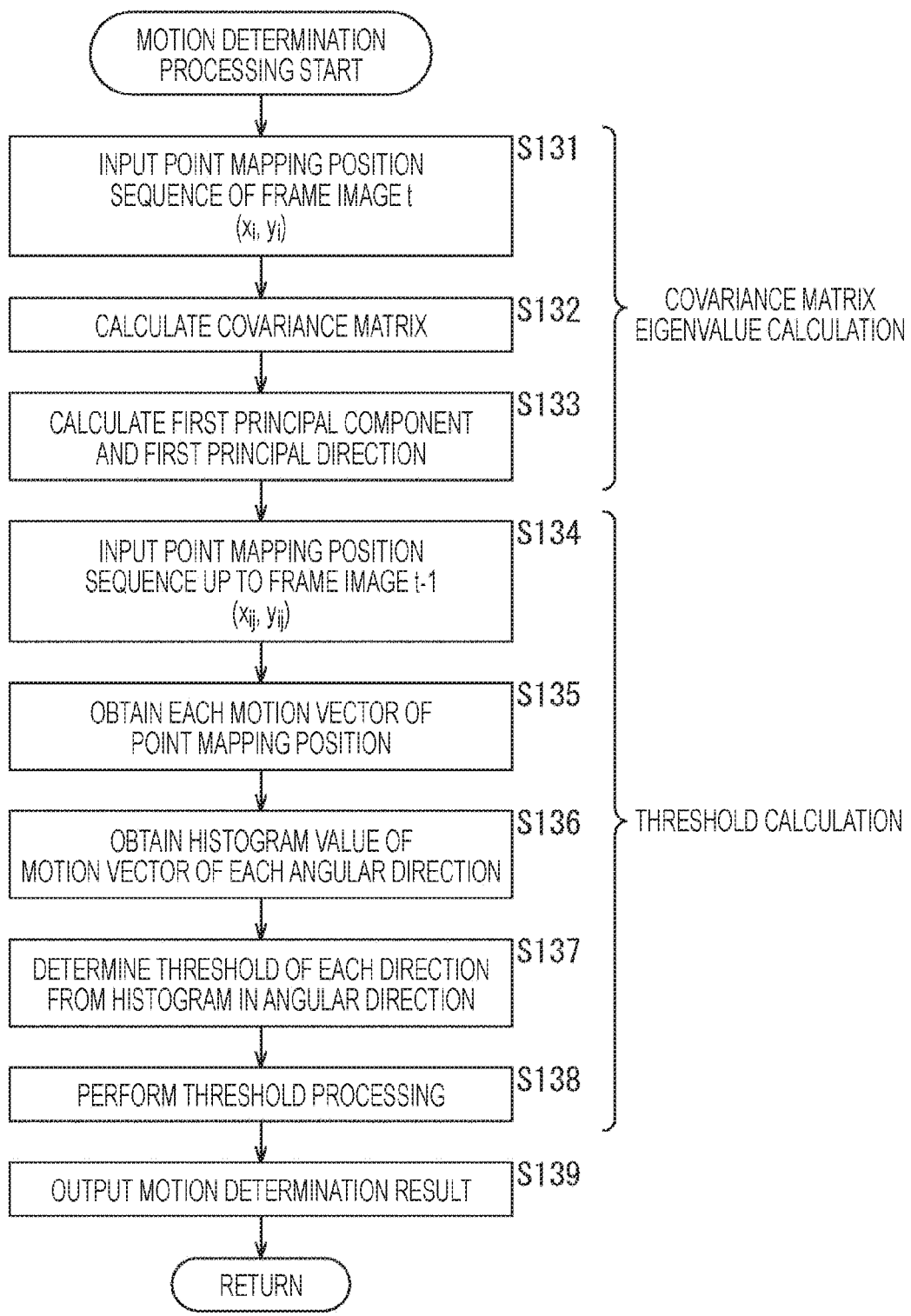
FIG. 19 is a flowchart illustrating the motion determination processing using a threshold for each direction by the motion determination unit in FIG. 5.

Motion determination processing using the threshold for each direction will be next described with reference to a flowchart in FIG. 19.

At step S131, the point mapping position sequence (xi, yi) of the frame image at time t is input to the covariance matrix eigenvalue calculation unit 71.

At step S132, the covariance matrix eigenvalue calculation unit 71 calculates the covariance matrix from the point mapping position sequence (xi, yi).

At step S133, the covariance matrix eigenvalue calculation unit 71 calculates the first principal component and the first principal component direction from the covariance matrix and outputs the same to the threshold calculation unit 72.

At step S134, the point mapping position sequence (xij, yij) of the frame image up to time t−1 is input to the threshold calculation unit 72.

At step S135, the threshold calculation unit 72 calculates a difference (Δx=xi, j−1−xi, j, Δy=yi, j−1−yi, j) between each point of the point mapping position sequence (xij, yij) to obtain the motion vector.

At step S136, the threshold calculation unit 72 integrates the motion vectors for each of the directions to obtain the histogram value (the magnitude of the integrated vector) in each direction.

At step S137, the threshold calculation unit 72 calculates a threshold in each direction from the histogram value for each direction.

At step S138, the threshold calculation unit 72 performs threshold determination depending on whether the first principal component vector of the frame image t (the length is of the first principal component, the direction is of the first principal component direction) falls within a polygonal region obtained by connecting the thresholds in the respective directions.

At step S139, the threshold calculation unit 72 outputs 0 when the first principal component vector falls within the polygonal region and outputs 1 when this does not fall within the same as the motion determination result.

By the above-described processing, it becomes possible to appropriately set the threshold in the four directions on the basis of the motion vector, and realize appropriate motion determination while taking into consideration the direction and the magnitude of the first principal component.

Since it is possible to set the threshold according to the motion direction in this manner, it is possible to loosely set the threshold in the vertical direction and strictly set the threshold in the horizontal direction, because it is known that resistance to the vertical direction is higher than that in the horizontal direction, for example, in detecting a face image and the like. In addition, in a case of an in-vehicle camera, since this is more susceptible to vibration in the vertical direction than in the horizontal direction, the loose threshold may be set in the horizontal direction and the strict threshold may be set in the vertical direction. Furthermore, in a case of a depth camera and the like, since it is desirable that resolution in the horizontal direction is higher, the threshold in the horizontal direction may be strictly set.

2. Second Embodiment

Although shooting of a still image is described above, it is also applicable to shooting of a moving image.

Figure 20:
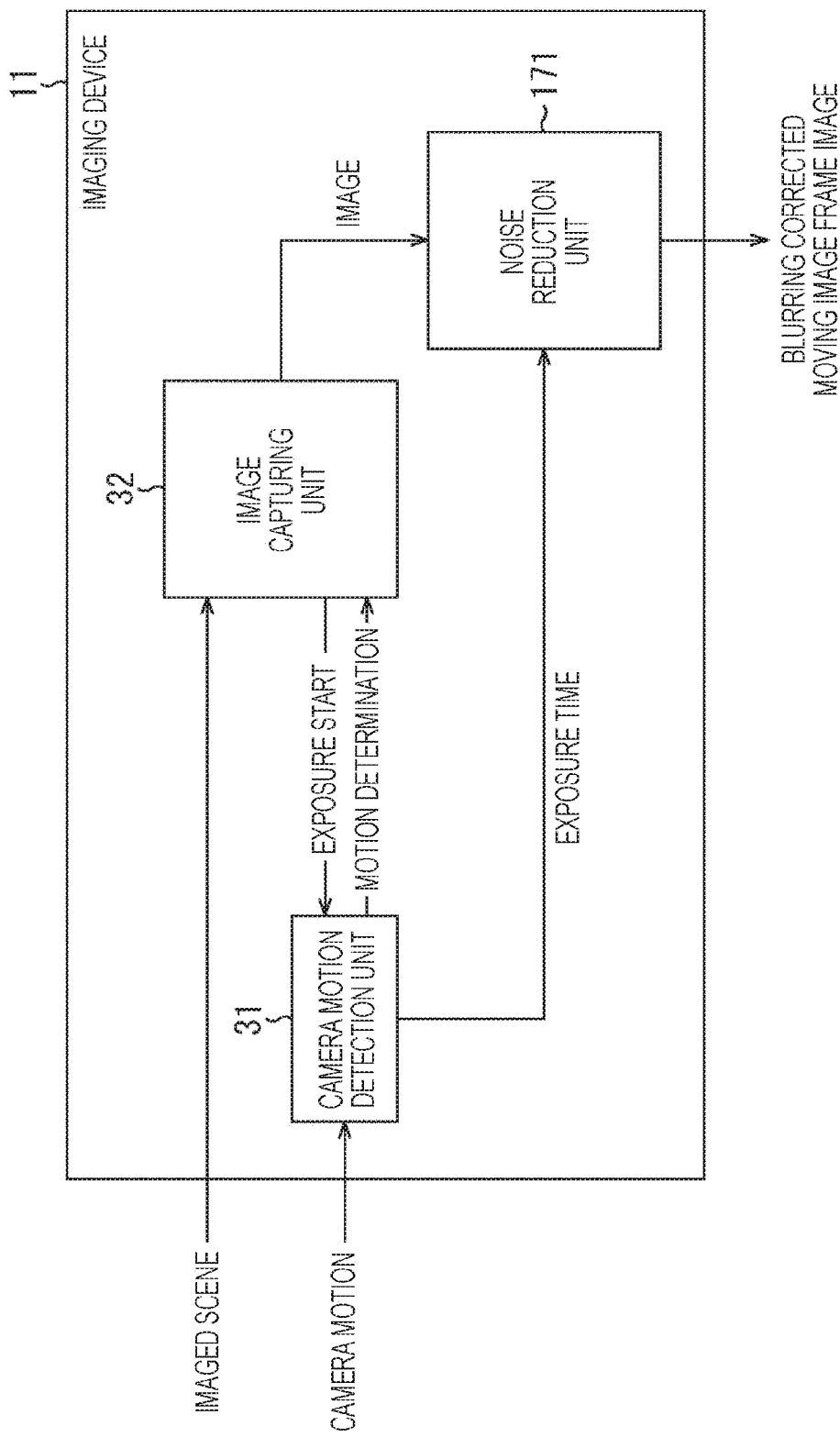
FIG. 20 is a view illustrating a configuration example of a second embodiment of a shooting device to which the technology of the present disclosure is applied.
Figure 21:
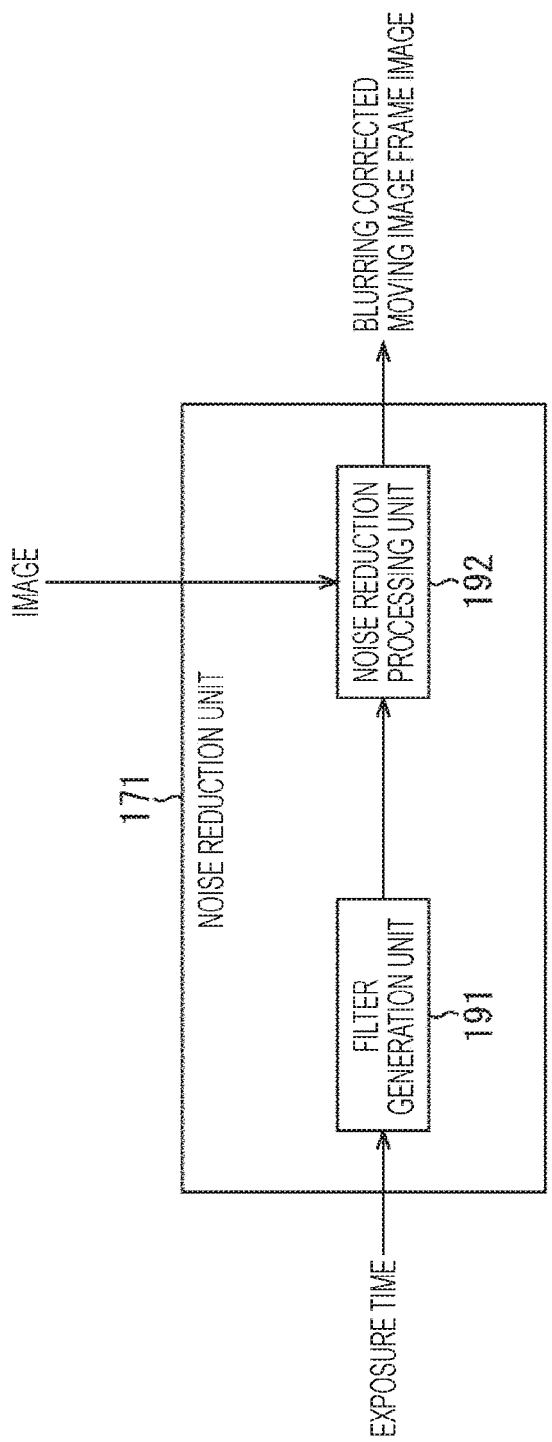
FIG. 21 is a view illustrating a configuration example of a noise reduction unit of the shooting device in FIG. 1.

FIG. 20 illustrates a configuration example of a second embodiment of a shooting device 11 which shoots a moving image to which the technology of the present disclosure is applied. Meanwhile, a configuration having the same function as the configuration of the shooting device 11 in FIG. 2 is assigned with the same name and same reference sign and the description thereof is appropriately omitted.

That is, the shooting device 11 in FIG. 20 is provided with an image shooting unit 32 which shoots a scene, a camera motion detection unit 31 which detects motion of a camera, and a noise reduction unit 171 which performs noise reduction processing by adjusting parameters in accordance with exposure time. That is, the shooting device 11 in FIG. 20 is different from the shooting device 11 in FIG. 2 in that the noise reduction unit 171 is provided in place of the data holding unit 33 and the blurring corrected image synthesis unit 34.

The camera motion detection unit 31 receives an exposure starting signal from the image shooting unit 32, measures the camera motion during the exposure, determines whether the camera motion exceeds a predetermined value, and outputs a determination result to the image shooting unit 32. Also, the camera motion detection unit 31 transmits the camera exposure time while shooting a frame image to the noise reduction unit 171.

The image shooting unit 32 exposes a scene to be shot to measure image data, transmits exposure starting timing to the camera motion detection unit 31, receives the motion determination result from the camera motion detection unit 31, determines to finish the exposure according to the motion determination result, performs gain correction on the shot image according to the exposure time, and outputs the corrected image data to the noise reduction unit 171.

The noise reduction unit 171 performs the noise reduction processing of the image data from the exposure time and the image data, and outputs a blurring corrected moving image frame image. Although brightness of the image is made uniform by gain correction processing by the image shooting unit 32, a noise amount is different because the exposure time is different. In order to suppress flicker of the moving image due to the amount of noise, the noise reduction unit 171 performs the noise reduction processing with intensity corresponding to the exposure time.

<Configuration Example of Noise Reduction Processing Unit>

The noise reduction unit 171 is provided with a filter generation unit 191 and a noise reduction processing unit 192.

The filter generation unit 191 receives the exposure time from the camera motion detection unit 31, generates a noise reduction filter, and outputs the same to the noise reduction processing unit 192.

The noise reduction processing unit 192 receives the image data from the image shooting unit 32, performs the noise reduction processing on the image data using the filter received from the filter generation unit 191, and outputs the blurring corrected moving image frame image.

For example, a median filter may be used, for example, as the filter corresponding to the exposure time generated by the filter generation unit 191. The median filter collects pixel values around a pixel of interest and replaces the pixel value of the pixel of interest with a center value. If this replaced pixel value is directly output, not only the noise but also texture of the original image is lost, so that a method such as blending the center value and the original pixel value to output is often used. A blending ratio of this blending may be changed according to the exposure time.

<Noise Reduction Processing>

Figure 22:
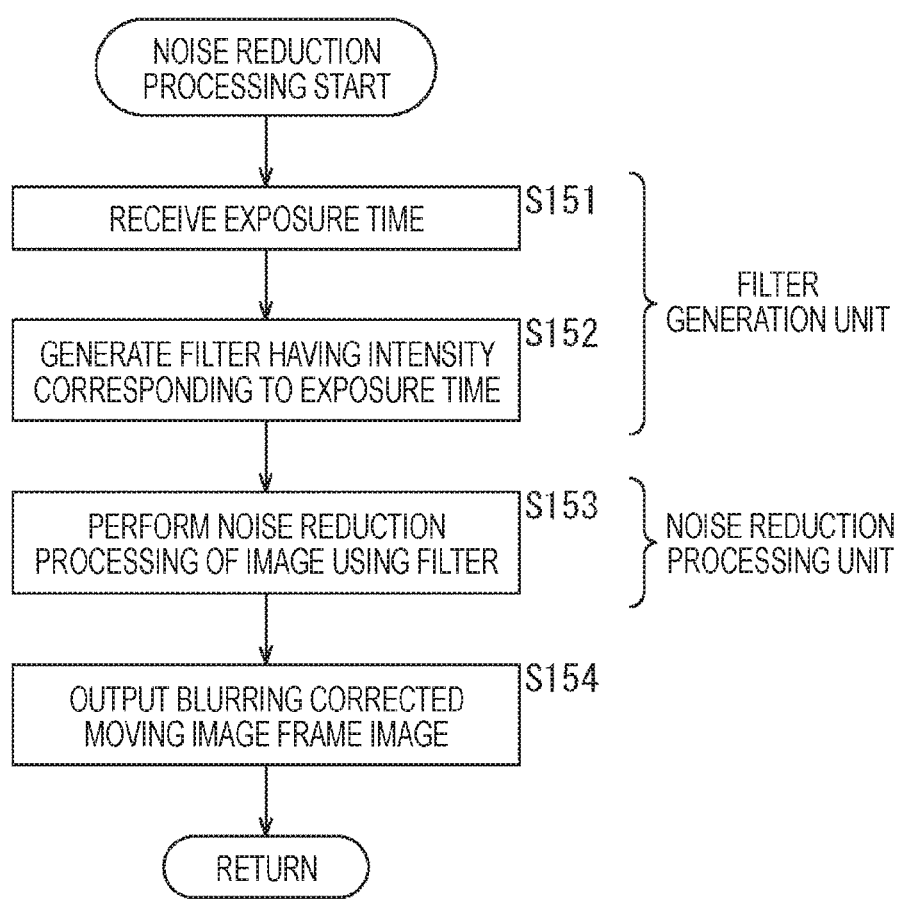
FIG. 22 is a flowchart illustrating noise reduction processing by a noise reduction processing unit in FIG. 21.

The noise reduction processing will be next described with reference to a flowchart in FIG. 22.

At step S151, the filter generation unit 191 receives the exposure time from the camera motion detection unit 31.

At step S152, the filter generation unit 191 generates the filter corresponding to the exposure time for noise reduction, and outputs the same to the noise reduction processing unit 192.

At step S153, the noise reduction processing unit 192 receives the image data from the image shooting unit 32 and performs the noise reduction processing on the image data using the filter received from the filter generation unit 191.

At step S154, the noise reduction processing unit 192 outputs the blurring corrected moving image frame image.

By the above-described processing, in a case where it is expected that the exposure time is short and the noise is large, it is possible to obtain a blended value in which the center value of the median filter is blended strongly, or in a case where it is expected that the exposure time is long and the noise is small, the original pixel value may be blended strongly. It goes without saying that the noise reduction filter is not limited to the median filter, and a filter having a noise reduction effect such as a Wiener filter or a bilateral filter may be used. In addition to changing the blending ratio between the original pixel value and the filtered pixel value, a filter coefficient itself may be changed according to the exposure time. That is, the filter coefficient may be switched to have a strong noise reduction effect in a case where the exposure time is short, and have a weak noise reduction effect in a case where this is long.

By the above-described processing, it is possible to detect a case in which the blurring is suppressed even if an "absolute value of blurring amount sum" is large by principal component analysis of a motion trajectory point sequence (point mapping position sequence), thereby making the exposure time longer, and at that time, it is possible to appropriately make the exposure time longer.

Also, a range of "the first principal component of the motion trajectory point sequence" may be made such that this may be corrected by in-plane blurring correction postprocessing. Furthermore, by controlling to limit within a predetermined "amount of dispersion of the first principal component of the motion trajectory point sequence", it is possible to leave the frequency component of the original image in a direction perpendicular to a specific blurring direction, and collect the different blurring directions, thereby obtaining high-accuracy blurring corrected result image.

3. Application

<Example of Executing by Software>

A series of processes described above may be executed by hardware or by software. In a case where the series of processes is executed by the software, a program which forms the software is installed from a recording medium on a computer built in dedicated hardware or a general-purpose personal computer or the like, for example, capable of executing various functions with various programs installed.

Figure 23:
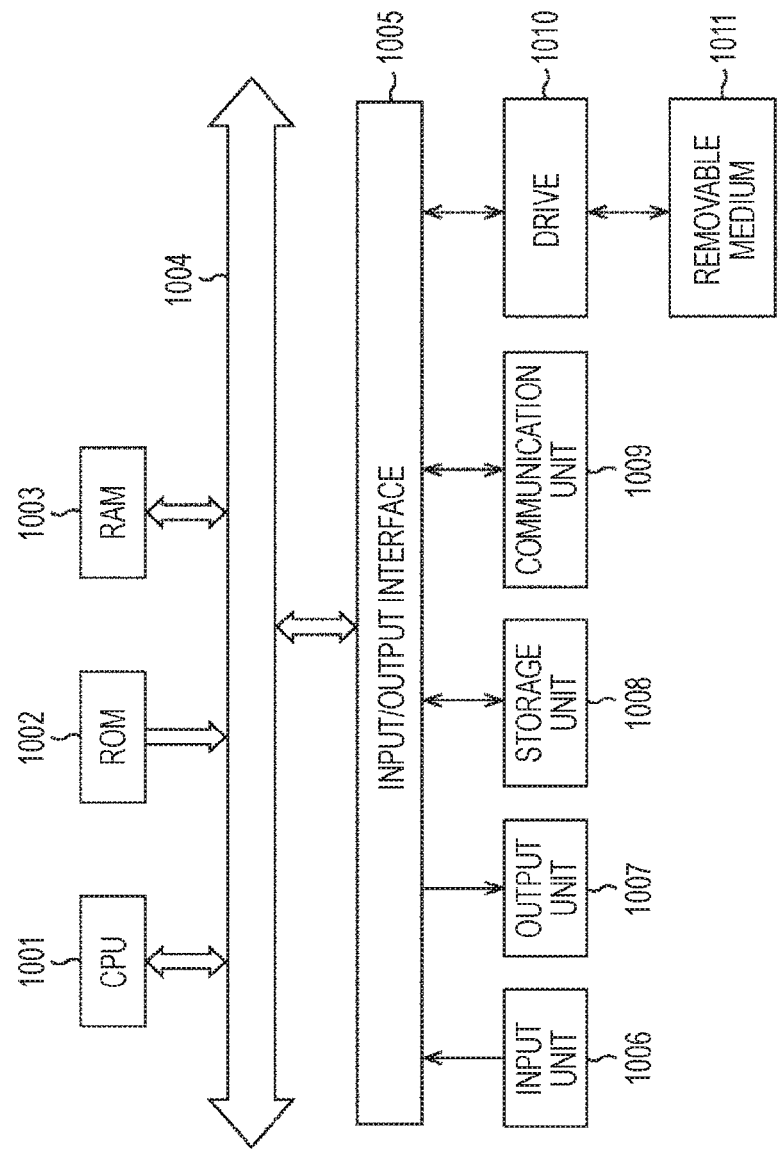
FIG. 23 is a view illustrating a configuration example of a general-purpose personal computer.

FIG. 23 illustrates a configuration example of the general-purpose personal computer. The personal computer includes a central processing unit (CPU) 1001 built-in. An input/output interface 1005 is connected to the CPU 1001 through a bus 1004. A read only memory (ROM) 1002 and a random access memory (RAM) 1003 are connected to the bus 1004.

An input unit 1006 including an input device such as a keyboard and a mouse with which a user inputs an operation command, an output unit 1007 which outputs a processing operation screen and an image of a processing result to a display device, a storage unit 1008 including a hard disk drive and the like which stores the program and various data, and a communication unit 1009 including a local area network (LAN) adopter and the like which executes communication processing through a network represented by the Internet are connected to the input/output interface 1005. Also, a drive 1010 which reads/writes data from/to a removable medium 1011 such as a magnetic disk (including a flexible disk), an optical disk (including a compact disc-read only memory (CD-ROM) and a digital versatile disc (DVD)), a magneto-optical disk (including a mini disc (MD)), or a semiconductor memory is connected.

The CPU 1001 executes various processes according to the program stored in the ROM 1002 or the program read from the removable medium 1011 such as the magnetic disk, the optical disk, the magneto-optical disk, or the semiconductor memory to be installed on the storage unit 1008 and loaded from the storage unit 1008 on the RAM 1003. Data required for the CPU 1001 to execute the various processes also or the like are appropriately stored in the RAM 1003.

In the computer configured in the above-described manner, the CPU 1001 loads the program stored in the storage unit 1008, for example, on the RAM 1003 through the input/output interface 1005 and the bus 1004 to execute, and according to this, the series of processes described above is performed.

The program executed by the computer (CPU 1001) may be recorded in the removable medium 1011 as a package medium and the like to be provided, for example. Also, the program may be provided by means of a wired or wireless transmission medium such as a local area network, the Internet, and digital broadcasting.

In the computer, the program may be installed on the storage unit 1008 through the input/output interface 1005 by mounting the removable medium 1011 on the drive 1010. Also, the program may be received by the communication unit 1009 by means of the wired or wireless transmission medium to be installed on the storage unit 1008. In addition, the program may be installed in advance on the ROM 1002 and the storage unit 1008.

Meanwhile, the program executed by the computer may be the program of which processes are performed in chronological order in the order described in this specification or may be the program of which processes are performed in parallel or at required timing such as when a call is issued.

Also, in this specification, a system is intended to mean assembly of a plurality of components (devices, modules (parts) and the like) and it does not matter whether all the components are in the same casing. Therefore, a plurality of devices stored in different casings connected through the network and one device obtained by storing a plurality of modules in one casing are the systems.

Meanwhile, the embodiment of the present disclosure is not limited to the above-described embodiments, and various modifications may be made without departing from the gist of the present disclosure.

For example, the present disclosure may be configured as cloud computing in which a function is shared by a plurality of devices through the network to process together.

Also, each step described in the above-described flowchart may be executed by one device or executed by a plurality of devices in a shared manner.

Furthermore, in a case where a plurality of processes is included in one step, a plurality of processes included in one step may be executed by one device or by a plurality of devices in a shared manner.

Meanwhile, the present disclosure may also have the following configuration.

<1> A shooting device provided with:

a camera motion detection unit which detects camera motion;

a comparison unit which calculates a distribution degree of a trajectory of the camera motion based on a result of the camera motion detection to compare with a predetermined threshold; and an exposure control unit which controls start and finish of exposure on the basis of a comparison result of the comparison unit.

<2> The shooting device according to <1>, in which the comparison unit calculates a first principal component of covariance as the distribution degree of the camera motion trajectory based on the camera motion detection result to compare with the predetermined threshold.

<3> The shooting device according to <1>, in which the comparison unit generates a point spread function (PSF) image for the camera motion detection result as the distribution degree of the camera motion trajectory based on the camera motion detection result, and performs frequency analysis to compare with the predetermined threshold.

<4> The shooting device according to <1>, in which the comparison unit approximates detection results in a certain range retroactive to predetermined time from current time by a pronominal as the distribution degree of the camera motion trajectory based on the camera motion detection result, extrapolates (extrapolates) motion in future time from the polynomial to measure, and compares with the predetermined threshold.

<5> The shooting device according to any one of <1> to <4>, in which the camera motion detection unit includes a gyroscope sensor, an acceleration sensor, a geomagnetic sensor, an altitude sensor, a vibration sensor, and a motion capture which tracks a marker of an object from a sub camera for detecting motion of a camera used for imaging different from the camera used for imaging to measure motion.

<6> The shooting device according to any one of <1> to <5>,
in which the exposure control unit controls to finish the exposure when it is regarded that the exposure is longer than minimum exposure time and not longer than maximum exposure time after the exposure is started and blurring is larger than predetermined blurring by the comparison result on the basis of the comparison result of the comparison unit.

<7> The shooting device according to any one of <1> to <6>,
in which the exposure control unit controls to finish the exposure when the maximum exposure time elapses after the exposure is started on the basis of the comparison result of the comparison unit.

<8> The shooting device according to any one of <1> to <7>,
in which, when the blurring is regarded to be larger than predetermined blurring by the comparison result at timing at which the exposure is started, the exposure control unit controls to delay the timing at which the exposure is started until the blurring is regarded to be smaller than the predetermined blurring by the comparison result on the basis of the comparison result of the comparison unit.

<9> The shooting device according to any one of <1> to <8>
in which the exposure control unit controls to finish the exposure in consideration of a signal to noise ratio (SNR) on the basis of the comparison result of the comparison unit.

<10> The shooting device according to any one of <1> to <9>, further provided with:
a noise removal unit which removes noise of an image by integrating a plurality of images taken at a predetermined interval by the camera.

<11> The shooting device according to <10>,
in which the noise removal unit further includes a noise removal unit which integrates only an image in which the blurring is smaller than predetermined blurring out of a plurality of images taken by the camera and removes noise of the image.

<12> The shooting device according to <10>,
in which the noise removal unit integrates a plurality of images taken by the camera while adding weights according to the exposure time, to remove the noise of the image.

<13> The shooting device according to <10>,
in which the noise removal unit integrates a plurality of images taken by the camera while adding weights in consideration of a direction of blurring of each image, to remove the noise of the image.

<14> The shooting device according to <10>,
in which the noise removal unit integrates a plurality of images taken by the camera while adding equal weight, to remove the noise of the image.

<15> The shooting device according to <10>,
in which the noise removal unit applies fast Fourier transform (FFT) on a plurality of images taken by the camera, collects a component of predetermined amplitude for each frequency component, and applies inverse FFT to generate an image, so that the noise of the image is removed.

<16> The shooting device according to <15>,
in which the noise removal unit applies the FFT on a plurality of images taken by the camera, collects a component of amplitude of a maximum value for each frequency component, and applies the inverse FFT to generate an image, so that the noise of the image is removed.

<17> A shooting method provided with steps of:
detecting camera motion;
calculating a distribution degree of a trajectory of the camera motion on the basis of a result of the camera motion detection to compare with a predetermined threshold; and
controlling start and finish of exposure on the basis of a comparison result.

<18> A program which allows a computer to serve as:
a camera motion detection unit which detects camera motion;
a comparison unit which calculates a distribution degree of a trajectory of the camera motion based on a result of the camera motion detection to compare with a predetermined threshold; and
an exposure control unit which controls start and finish of exposure on the basis of a comparison result of the comparison unit.

REFERENCE SIGNS LIST

11 Shooting device
31 Camera motion detection unit
32 Image shooting unit
33 Data holding unit
34 Blurring corrected image synthesis unit
51 Motion detection unit
52 Motion determination unit
71 Covariance matrix eigenvalue calculation unit
72 Threshold calculation unit
91 PSF image generation unit
92 Frequency analysis unit
101 Exposure control unit
102 Exposure unit
103 Gain correction unit
121 Memory
141 Image alignment unit
142 Blend processing unit
143 Frame memory
144 Corrected image output unit
171 Noise reduction unit
191 Filter generation unit
192 Noise reduction processing unit

The invention claimed is:
1. A shooting device, comprising:
a central processing unit (CPU) configured to:
  detect camera motion;
  calculate a distribution degree of a trajectory of the camera motion based on the camera motion, wherein a first principal component of covariance is calculated as the distribution degree of the trajectory of the camera motion;
  compare the distribution degree of the trajectory of the camera motion with a determined threshold; and
  control start and finish of exposure based on a comparison result of the comparison.

2. The shooting device according to claim 1, wherein the CPU is further configured to:
generate a point spread function (PSF) image for the camera motion as the distribution degree of the trajectory of the camera motion based on the camera motion, and
execute frequency analysis of the PSF image to compare with the determined threshold.

3. The shooting device according to claim 1, wherein the CPU is further configured to:
approximate detection results of the camera motion in a certain range retroactive to a determined time from current time by a polynomial as the distribution degree of the trajectory of the camera motion based on the camera motion; and
extrapolate the camera motion in future time based on the polynomial.

4. The shooting device according to claim 1, wherein the CPU further includes a gyroscope sensor, an acceleration sensor, a geomagnetic sensor, an altitude sensor, a vibration sensor, and a motion capture,
the motion capture is configured to track a marker of an object from a sub camera,
the sub camera detects motion of a first camera,
the first camera is different from a second camera that is used to measure the camera motion.

5. The shooting device according to claim 1, wherein the CPU is further configured to finish the exposure based on:
the exposure that is longer than a minimum exposure time,
the exposure that is not longer than a maximum exposure time after the exposure is started, and
blur amount is larger than determined blur amount based on the comparison result.

6. The shooting device according to claim 1, wherein the CPU is further configured to finish the exposure based on a maximum exposure time that elapses after the exposure is started.

7. The shooting device according to claim 1, wherein the CPU is further configured to delay a time at which the exposure is started until a blur amount is smaller than a determined blur by the comparison result, and
the delay is based on the blur amount that is larger than the determined blur by the comparison result at a time of start of the exposure.

8. The shooting device according to claim 1, wherein the CPU is further configured to finish the exposure in consideration of a signal to noise ratio (SNR) based on the comparison result.

9. The shooting device according to claim 1, wherein the CPU is further configured to remove noise of an image based on integration of a plurality of images taken at a determined interval by the shooting device, and
the shooting device is a camera.

10. The shooting device according to claim 9,
wherein the CPU is further configured to:
integrate the image, in which a blur amount is smaller than a determined blur, of the plurality of images, wherein the plurality of images is taken by the camera; and
remove the removes noise of the image.

11. The shooting device according to claim 9, wherein the CPU is further configured to:
integrate the plurality of images taken by the camera by addition of weights based on an exposure time; and
remove the noise of the image based on the integration.

12. The shooting device according to claim 9, wherein the CPU is further configured to:
integrate the plurality of images taken by the camera by addition of weights based on a direction of blur of each image of the plurality of images; and
remove the noise of the image based on the integration.

13. The shooting device according to claim 9, wherein the CPU is further configured to:
integrate the plurality of images taken by the camera by addition of an equal weight; and
remove the noise of the image based on the integration.

14. The shooting device according to claim 9,
wherein the CPU is further configured to:
apply fast Fourier transform (FFT) on the plurality of images taken by the camera;
collect a component of determined amplitude for each frequency component of a plurality of frequency components; and
apply inverse FFT to generate the image, such that the noise of the image is removed.

15. The shooting device according to claim 14, wherein the CPU is further configured to:
apply the FFT on the plurality of images taken by the cameral;
collect a component of amplitude of a maximum value for each frequency component of the plurality of frequency components; and
apply the inverse FFT to generate the image, such that the noise of the image is removed.

16. A shooting method, comprising:
detecting camera motion;
calculating a distribution degree of a trajectory of the camera motion based on the camera motion, wherein
a first principal component of covariance is calculated as the distribution degree of the trajectory of the camera motion;
compare the distribution degree of the trajectory of the camera motion with a determined threshold; and
controlling start and finish of exposure based on a comparison result of the comparison.

17. A non-transitory computer-readable medium having stored thereon, computer-executable instructions, which when executed by a computer, cause the computer to execute operations, the operations comprising:
detecting camera motion;
calculating a distribution degree of a trajectory of the camera motion based on the camera motion, wherein
a first principal component of covariance is calculated as the distribution degree of the trajectory of the camera motion;
compare the distribution degree of the trajectory of the camera motion with a determined threshold; and
controlling start and finish of exposure based on a comparison result of the comparison.

18. A shooting device, comprising:
a central processing unit (CPU) configured to:
detect camera motion;
calculate a distribution degree of a trajectory of the camera motion based on the camera motion, wherein
a point spread function (PSF) image for the camera motion is generated as the distribution degree of the trajectory of the camera motion based on the camera motion;
execute frequency analysis of the PSF image;
compare a frequency component in the PSF image with a determined threshold based on the frequency analysis; and
control start and finish of exposure based on a comparison result of the comparison.

19. A shooting device, comprising:
a central processing unit (CPU) configured to:
detect camera motion;
calculate a distribution degree of a trajectory of the camera motion based on the camera motion;
compare the distribution degree of the trajectory of the camera motion with a determined threshold;
control start and finish of exposure based on a comparison result of the comparison; and remove noise of an image by integrating a plurality of images taken at a determined interval by the shooting device,
wherein the plurality of images is integrated while an equal weight is added, to remove the noise of the image.

* * * * *